United States Patent
Niyogi et al.

(10) Patent No.: US 10,216,788 B2
(45) Date of Patent: *Feb. 26, 2019

(54) DETERMINING CONTACT RELATED INFORMATION

(71) Applicant: SugarCRM Inc., Cupertino, CA (US)

(72) Inventors: Somrat Niyogi, Burlingame, CA (US); Jason McDowall, El Segundo, CA (US); Pushkar Singh, Fremont, CA (US); Andreas Sandberg, Pacifica, CA (US); Wiebke Poerschke, San Francisco, CA (US)

(73) Assignee: SUGARCRM INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/937,828

(22) Filed: Mar. 27, 2018

(65) Prior Publication Data

US 2018/0218029 A1    Aug. 2, 2018

Related U.S. Application Data

(63) Continuation of application No. 14/091,210, filed on Nov. 26, 2013, now Pat. No. 9,928,272.

(51) Int. Cl.
*G06F 17/30* (2006.01)

(52) U.S. Cl.
CPC .. *G06F 17/30386* (2013.01); *G06F 17/30053* (2013.01)

(58) Field of Classification Search
CPC ................................. G06F 17/30386
USPC ................................. 707/692, 758
See application file for complete search history.

(56) References Cited

U.S. PATENT DOCUMENTS

| | | | |
|---|---|---|---|
| 2012/0117036 A1* | 5/2012 | Lester | G06Q 10/109 707/692 |
| 2013/0191466 A1* | 7/2013 | Perlow | G06Q 50/01 709/206 |
| 2015/0012554 A1* | 1/2015 | Midtun | G06Q 10/10 707/758 |

\* cited by examiner

*Primary Examiner* — Chelcie L Daye
(74) *Attorney, Agent, or Firm* — Steven M. Greenberg, Esq.; Shutts & Bowen LLP

(57) ABSTRACT

Displaying contact-related information is disclosed. An association between a contact address not specific to a source of contact-related information and an identity of an entity at the source of contact-related information may be determined. Information representing the association between the contact address and the identity of the entity at the source of contact-related information is stored. The information representing the association is stored at a node associated with a service configured to use the information representing the association to retrieve from the source of contact-related information a response data associated with the entity in response to an expression of interest in a contact with which the contact address is associated.

9 Claims, 14 Drawing Sheets

DETERMINING CONTACT RELATED INFORMATION

RELATED APPLICATIONS

This application is a Continuation Application of U.S. application Ser. No. 14/091,210, filed on Nov. 26, 2013, entitled "DETERMINING CONTACT RELATED INFORMATION", the entire text of which is specifically incorporated by reference herein.

BACKGROUND OF THE INVENTION

To gain information about a contact (e.g., a person), it is often necessary to perform separate searches of multiple sources. Traditionally, information about a contact may be retrieved by querying websites, social network profiles, prior communications with the contact (e.g., email), an address book, enterprise data storage, and many other sources. The process of searching all of these separate sources to gain information about a contact may be time intensive, cumbersome, and inefficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A platform displaying contact-related information associated with a contact (e.g., a person) from multiple sources is disclosed herein. Such a platform may be useful for a user to quickly gain information about a contact by reviewing a display of contextually-determined information about the contact retrieved from one or more sources. In some embodiments, an indication of interest in a contact identifier (e.g., an email address), or other meta-information associated with a contact and potentially usable to identify a contact, is received. One or more sources are searched for contact-related information associated with the contact (e.g., contact-related information, contact-associated information), and a display is provided that includes the information associated with the contact. In various embodiments, a plurality of sources may be searched and/or a source external to an application or other user context in which the indication is received may be searched.

Figure 1:
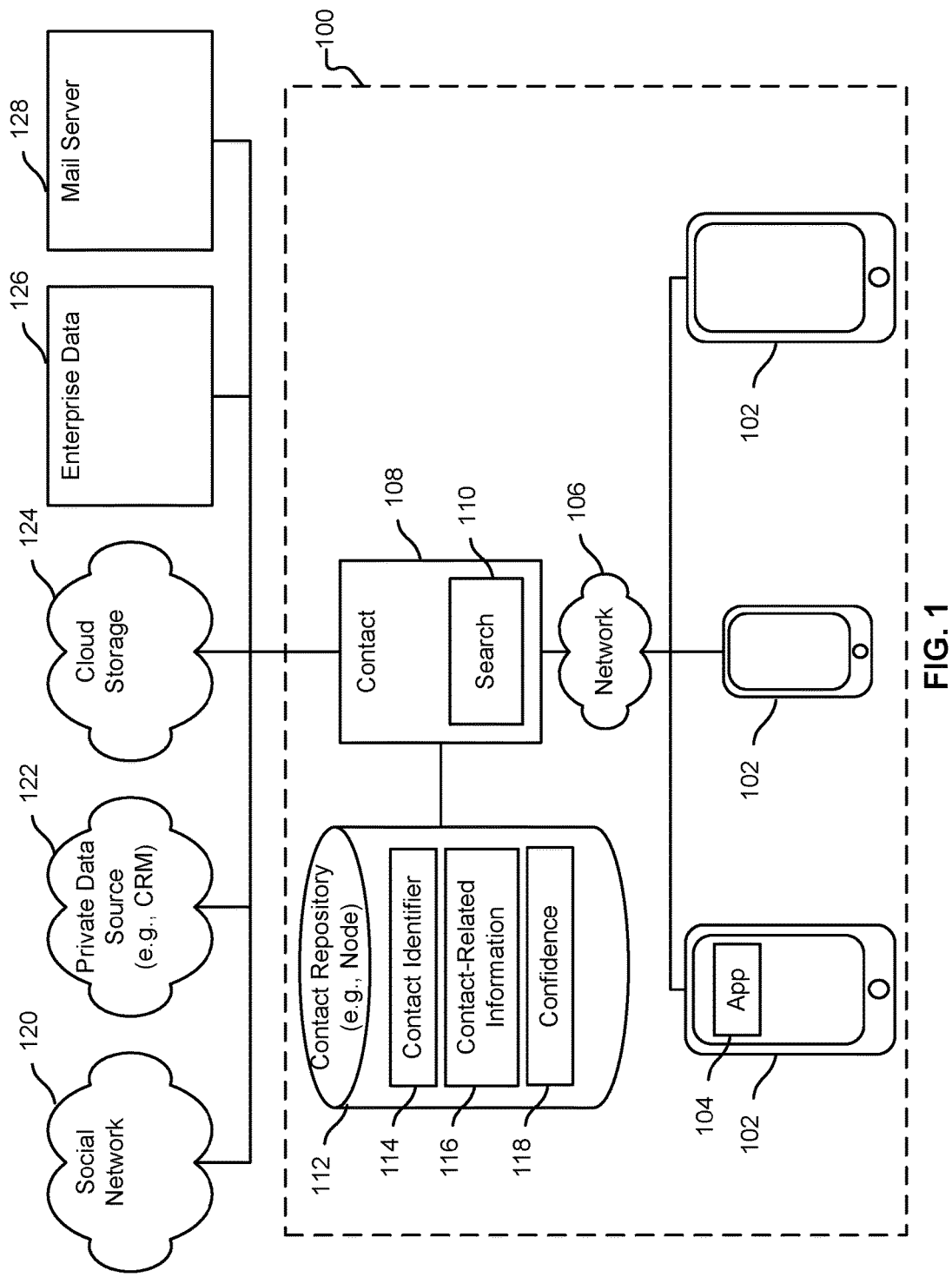
FIG. 1 is a diagram showing an embodiment of a system to determine contact-related information.

FIG. 1 is a diagram showing an embodiment of a system to determine contact-related information. In the example shown, a system to display contact-related information 100 is associated with one or more mobile devices 102 (e.g., smartphones, tablets, computers, and/or any computer-related devices). Mobile devices 102 may include a communication application 104 (e.g., an email application). Mobile devices 102 may communicate with system 100, or other components thereof, via a network 106 (e.g., cellular communications network, local area network, wide area network, the Internet, or any appropriate communication network). In some embodiments, mobile devices 102 may communicate with a contact engine 108 (e.g., contact-related information engine, contact mapping engine). The communication application 104 may be configured to, in various embodiments, communicate with contact engine 108.

In the example shown in FIG. 1, contact engine 108 is associated with a search proxy 110. The search proxy 110, in various embodiments, communicates with one or more sources of information as discussed below.

In the example shown in FIG. 1, contact engine 108 is associated with (e.g., stores information in, communicates with) a contact information repository 112. Contact information repository 112 may, for example, include a database (e.g., node, storage node, data structure, table, etc.) storing for each of a set of one or more contact identifiers 114 (e.g., contact address(es), email address(es), user account(s), contact names, and/or other contact-related information), contact-related information associated with a contact 116 (e.g., contact-associated information), confidence of association information 118 (e.g., confidence(s) of association, confidence level(s), likelihood(s) of association, probability(ies) of association, confidence values, confidence binding values), and/or other information. Information stored in contact repository 112 may, in some embodiments, be encrypted (e.g., stored in hash). For example, a contact identifier sjmith@xyz.com may be encrypted and stored in contact information repository 112 in an encrypted format. Information may be encrypted and decrypted as necessary to maintain the security of proprietary data and functionality of the system 100.

In some embodiments, a contact engine 108 may communicate with one or more information sources. The one or more sources may include, for example, one or more social networks 120 (e.g., business contact network service(s) (e.g., LinkedIn™), Facebook™ Google+™) private data sources 122 (e.g., customer relationship management (CRM) services (e.g., Salesforce™), software as a service (SaaS) suite(s) (e.g., Zendesk™)), cloud storage services 124 (e.g., Dropbox™, Google Drive™, Box™, etc.), enterprise data sources 126 (e.g., Sharepoint™, file servers), mail services 128 (e.g., Microsoft Exchange™, Gmail™), search engine(s) (not shown), and/or any other type of data sources.

According to various embodiments, the contact engine 108 and/or search proxy 110 may search the one or more information sources 120-128 for information associated with a contact. The search proxy 110 may retrieve sets of contact-related information from the plurality of sources 120-128 based on the search for contact-related information. In some embodiments, the contact engine 108 may determine contact-related information for display on one or more mobile devices 102 and may provide the contact-related information for display in the context of a communication application 104 on a mobile device 102.

In some embodiments, mobile device(s) 102 may communicate directly with one or more sources 120-128. Mobile device(s) 102 may be configured with the same functionality as the contact engine 108, search proxy 110, contact repository 112, and/or other components discussed above. In various embodiments, a mobile device 102 may communicate with both the plurality of sources 120-128 and the contact engine 108.

Figure 2:
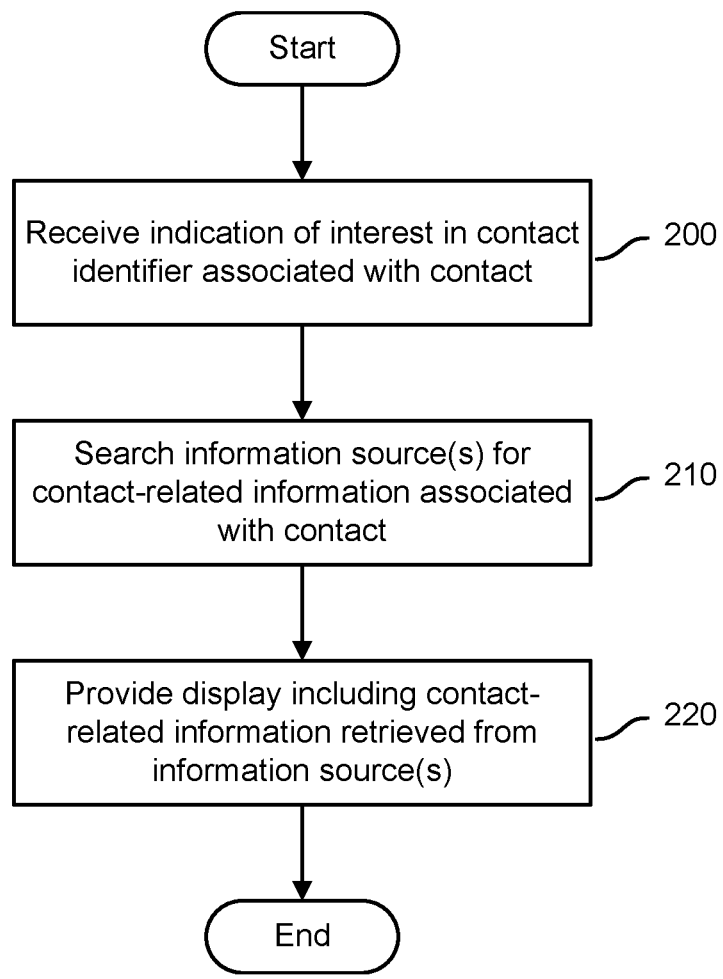
FIG. 2 is a flowchart illustrating embodiments of a process to determine contact-related information.

FIG. 2 is a flowchart illustrating embodiments of a process to determine contact-related information. In various embodiments, the process is performed by system 100 depicted in FIG. 1. At 200, an indication of interest in contact meta-information associated with a contact is received. In various embodiments, the contact meta-information may include a contact identifier (e.g., a contact name or email address) and/or a text, image, or other displayed content associated with a contact. In some embodiments, an indication of interest in the contact meta-information may be received in the context of a mobile or other application (e.g., an email application, an instant messaging application, text application, or any other application). A contact identifier may include, for example, an email address, name, username, avatar, profile, or other information associated with a contact. The contact identifier may, for example, be displayed in a mobile application. A contact may be a person, organization, persona, and/or entity.

In some embodiments, an indication of interest in contact meta-information may include input related to the contact meta-information and/or a representation thereof as displayed to a user. An indication of interest may be received when, for example, a user touches, taps (e.g., clicks), makes contact with (e.g., contacts using a finger, a stylus and/or other device), gestures, and/or otherwise interacts with a region of a mobile device displaying a contact identifier (e.g., an email address). In some cases, an indication of interest in a contact identifier (e.g., an email address or other information) may be received in (e.g., typed into) an application of a mobile device. In some embodiments, an indication of interest in a contact identifier may be received via audio input (e.g., voice input), haptic input (e.g., shaking the device in a prescribed way), or any other input.

In some embodiments, an indication of interest in a contact identifier may be received when a user interacts with content sent by a contact (e.g., a contact associated with the contact identifier); interacts with content sent to the contact identifier; and/or references a contact identifier, contact meta-information, and/or any other contact-related information. These example indications of interest may include indirect indications of interest.

By way of example, an email application on a mobile device may display an email address (e.g., in the "to," "from," carbon copy ("cc"), message body, and/or other field(s) of an email client application), and an indication of interest in the email address may be received when a user interacts with (e.g., touches) the email address. In some cases, an indication of interest in a contact identifier may be received when an email address is entered into an email application on a mobile device.

At 210, one or more sources may be searched for contact-related information associated with a contact. In various embodiments, the source(s) may include a source external to an application context in which the indication of interest was received and/or a source external to a mobile or other device at and/or via which the indication of interest was received and/or generated. In some embodiments, a plurality of sources may be searched. In some embodiments, the contact identifier (e.g., an email address) and/or information associated with the contact identifier may be used to generate a search against a plurality of sources. The contact identifier and/or information associated with the contact identifier may be parameters in the search against the plurality of sources. By way of example, information associated with the contact identifier may include information related to a person (e.g., name(s), a location, compan(ies), employment information, keywords, interests, and/or any other information associated with a person). In some embodiments, information associated with the contact identifier may have been retrieved in previous searches against the plurality of sources. In one example, information associated with a contact may be retrieved in a search against a contact directory associated with the mobile device, enterprise, and/or other source.

At 220, a display including the information associated with the contact may be provided in the context of the mobile application. A display may include a window, view, and/or organization of information on the screen of a mobile device. The display may include sets of information associated with the contact. Various embodiments of a display in the context of a mobile application are discussed below.

Information associated with the contact may include sets of information from the plurality of sources. In some embodiments, the sets of information associated with a contact may include information associated with the contact that is determined to be relevant to the user of the mobile application. The sets of information may include information associated with a contact that is relevant to the relationship (e.g., recency and/or frequency of communication, history of correspondence, stage of transaction as recorded in a CRM tool) between a user of a mobile application and the contact. The sets of information may include information associated with a contact appropriate for display to a user based on credentials associated with the user.

Figure 3:
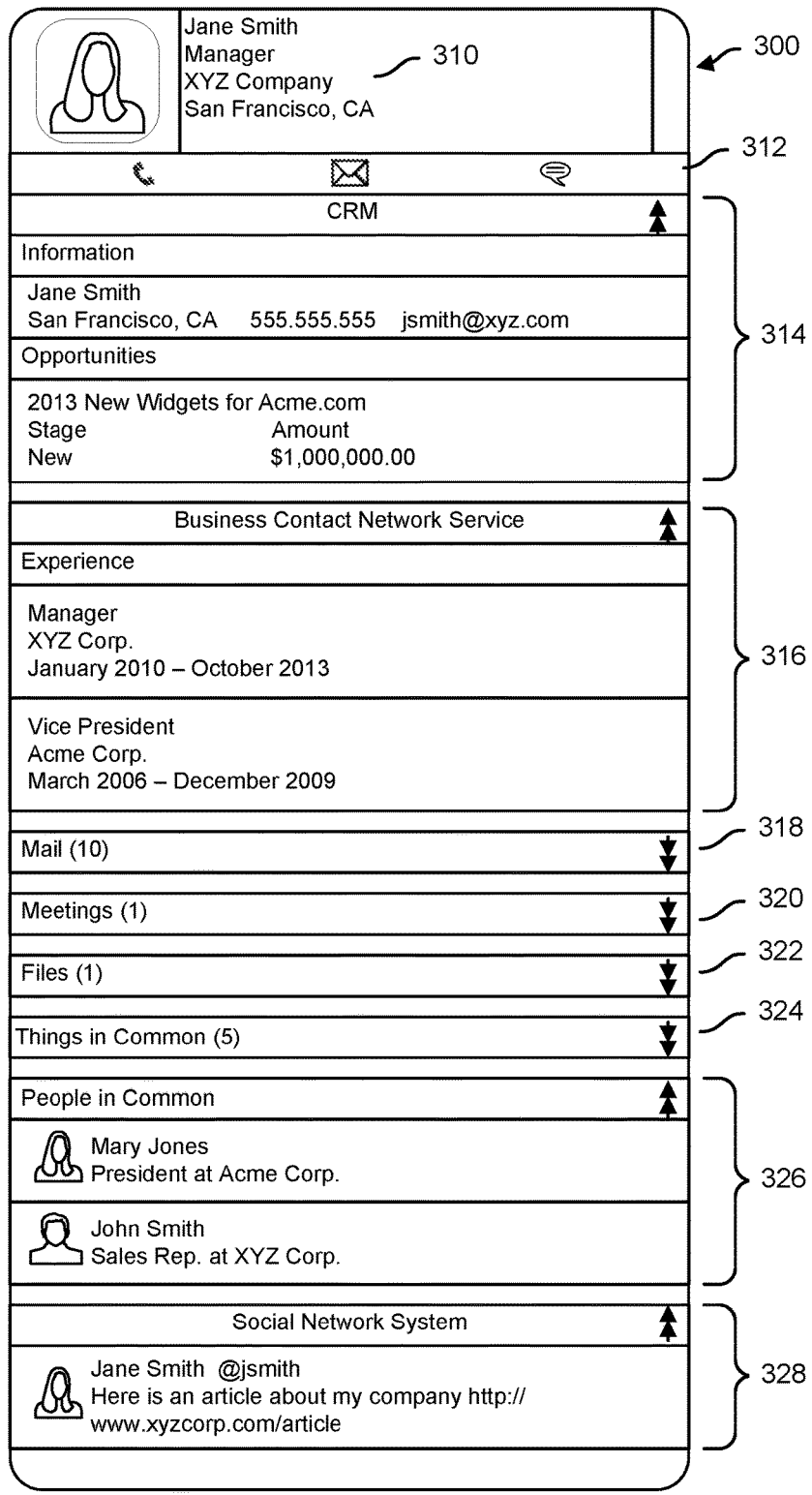
FIG. 3 is a diagram depicting an embodiment of a display of contact-related information on a mobile device.

FIG. 3 is a diagram depicting an embodiment of a display of contact-related information on a mobile device. A display 300 (e.g., contact detail view) may be provided in the context of a mobile application (e.g., a mobile application 104 used by a user of system 100 depicted in FIG. 1). The display 300 may include a representation of information associated with a contact (e.g., sets of information associated with a contact) that has been retrieved from a plurality of sources.

In the example display 300 shown in FIG. 3, a header 310 may be displayed, for example, along the top of the display 300. A header 310 may include information associated with a contact including, for example, a picture, name, title, company, geographic area, and/or other information associated with a contact. One or more buttons 312 may be displayed including, for example, phone, email, chat, maps, and/or other buttons each configured to facilitate communication with the contact. In various embodiments, a display 300 may include CRM information 314 associated with a contact. For example, the CRM information 314 may include information included in a CRM account associated with the contact. This information may include general information associated with the contact (e.g., name, location, phone number, email address, etc.), business-associated information (e.g., sales information, business contract information, and/or any other information related to a business), and/or any other information associated with a CRM system. A display 300 may include information associated with a business contact network service 316. Information from a business contact network service 316 may include, for example, employment information (e.g., job title(s), compan(ies), organization(s), time periods of employment, description of job function(s), credential(s), curriculum vitae (CV), and/or other employment/resume associated information). A display 300 may include email communications associated with the contact 318. For example, the email communications 318 may include a representation of recent emails (e.g., the last ten emails) between a user and the contact. The representation may include the full text of the emails, a summary of the emails, an indication of whether the contact opened the email or other included content (e.g., an attachment), and/or any other representation related to email(s). A display 300 may include meeting information associated with the contact 320. The display of meeting information 320 may include a list of times, descriptions, and/or other information associated with meetings between a user and the contact.

Additionally, a display 300 may include a representation of files 322 associated with the contact. In some embodiments, the files 322 may include files stored on a cloud file storage system (e.g., cloud file storage 124 of FIG. 1). For example, the files may include documents, spreadsheets, and/or other types of files. The files may include, for example, files that are shared between and/or jointly authored by the user and the contact. The files 322 may include any other type of file associated with a contact that is stored in a cloud storage service, in an enterprise storage location, and/or any other storage location. A display 300 may include things in common 324 (e.g., items, interests, and/or other information in common) between a user and the contact. A display 300 may include people in common 326 between a user and the contact. People in common may be one or more people to whom a user of the mobile application and the contact are both connected. For example, people in common 326 may be determined based on information associated with a business contact network service, a social network, a user's contacts on the mobile device, and/or other sources. The display of people in common 326 may include a representation of credentials, resume, and/or CV information associated with the one or more people in common. A display 300 may include a display of social network information 328 associated with the contact. Social network information 328 may include, for example, information from a social network account (e.g., Facebook™, Twitter™, and/or any other social network) associated with a contact. For example, the display of social network information 328 may include a representation of recent postings associated with a contact.

The display 300 depicted in FIG. 3 is one example display of information associated with a contact. A display 300 may of course include additional information associated with a contact retrieved from sources other than those discussed herein. Ultimately, a display 300 may also include any information associated with a contact arranged or organized for display in any manner.

Figure 4:
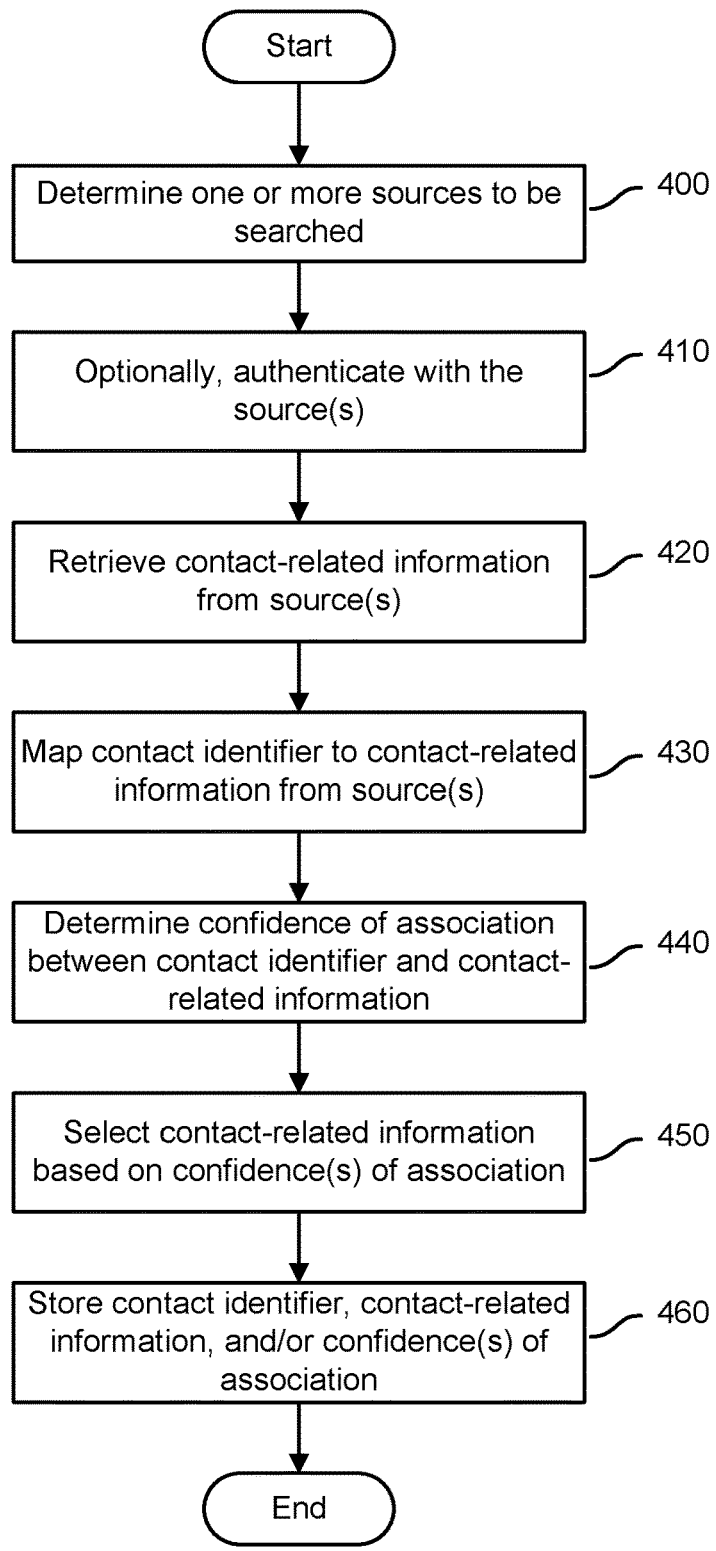
FIG. 4 is a flowchart illustrating embodiments of a process of searching for information associated with a contact.

FIG. 4 is a flowchart illustrating embodiments of a process of searching for information associated with a contact. In various embodiments, the process is performed by system 100 depicted in FIG. 1. At 400, one or more sources (e.g., information sources) to be searched are determined. In various embodiments, sources to be searched may be determined based on, for example, a contact identifier, information associated with a contact identifier, and/or other information. For example, a contact identifier (e.g., an email address, a name) may be associated with information retrieved in prior searches, information stored in a database (e.g., a contact database on mobile device), and/or any other information.

In some embodiments, a search (e.g., query) may be generated based on the contact identifier (e.g., information associated with the contact identifier), information associated with a user of a mobile application, and/or other information. The search may be performed against one or more information sources (e.g., social network services, private data sources, cloud storage services, search engines, enterprise data storage, mail servers, and/or other sources) to determine whether a source includes information associated with the contact.

In some embodiments, the source(s) to be searched may be determined at least in part by determining which, if any, source(s) has/have users, records, identities, or other entities that have previously been determined to have been associated with the contact identifier and/or other meta-information with respect to which an indication of interest has been received. For example, if email address user123@abc.com previously has been determined to be associated with a specific LinkedIn™ or other social network user/account, the previously-determined association may be used to select LinkedIn™ as a source to be searched.

At 410, a connection to the source(s) to be searched may be generated, if necessary. A system (e.g., system 100 of FIG. 1) may connect to one or more sources by, for example, logging in to the sources, establishing a connection using an application programing interface (API) associated with sources, by authenticating with the sources (e.g., using OAuth and/or other authorization approaches), by sending and receiving hypertext markup language requests and responses with the sources, and/or using any other techniques. The techniques of connection may be unique to each source. In some embodiments, a user may be prompted for information (e.g., username and password) to facilitate authorization with a source.

At 420, contact-related information may be retrieved from one or more sources. Information may be retrieved from multiple different sources including public sources (e.g., social network services, business contact social network services, search engine(s), cloud file storage, etc.), proprietary sources (e.g., CRM services), enterprise service sources (e.g., enterprise file storage, mail server, etc.), and/or other sources. In some embodiments, methods of retrieval may be unique to each source. For example, some sources may allow data to be retrieved using function calls (e.g., JavaScript function calls), some sources may use data quer(ies), other sources may be configured for interface with an API, some sources may broadcast data in an extensible markup language (XML) feed, etc.

By way of example, information associated with a contact may be retrieved from a source using an API. A source may, for example, be associated with an API, and an API call may be generated based on a contact identifier, information associated with the contact identifier, information associated with a user of the application, and/or other information. Based on an API call, the source may return information associated with a contact in a variety of formats including, for example, XML, JavaScript (e.g., JavaScript Object Notation (JSON)), hypertext markup language (HTML), and/or any other format. For example, a mobile application user may be authorized with a source, and an API call may be made to the source to retrieve information associated with a contact based on an email address, name, location, credentials, and/or other information associated with the contact. API calls may be generated to return contact-related information including, for example, an account name (e.g., social network handle, identifier, etc.) associated with a contact; a name of a contact; content, data, and/or information associated with a contact (e.g., social network postings, credentials (e.g., resume, CV, etc.)); connections, friends, and/or followers of a contact; and/or any other type of information associated with a contact. Ultimately, any type of information associated with a contact may be retrieved for a source.

At 430, a contact identifier may be mapped to contact-related information associated with a contact from one or more of the sources selected to be searched. In various embodiments, retrieving information may include one or more of using a previously-determined mapping of contact meta-information to an identity or other entity at a source and/or using the contact meta-information and/or information derived therefrom (e.g., from other searched sources) to query or otherwise search the source. In some embodiments, the latter search may return results that may be used to determine, possibly for future use, an association between the contact meta-information and a newly-identified entity at the source.

In various embodiments, a contact identifier may be mapped to information retrieved from a source by determining whether the information from the source is associated with the contact identifier. For example, a contact identifier (e.g., jsmith@xyz.com) may be used to query and/or retrieve information from a social network. The results of this query may include one or more accounts associated with Jane Smith (e.g., @jsmith, @janesmith, etc.). The contact identifier may be mapped to each of these accounts based on the results of the search, and the mapped information may be stored in an information repository.

In various embodiments, a contact identifier may be mapped to multiple sets of information associated with a contact. Sets of information may include, for example, accounts on a social network (e.g., @jsmith, @janesmith, etc.), file(s) stored in a cloud storage service, accounts in a CRM service, email(s), file(s) stored in enterprise storage, and/or any other information. In some cases, a contact identifier may be mapped to multiple sets of contact-related information from one source (e.g., multiple social network accounts). Some of the sets of contact-related information may turn out to have been determined in error to be associated with the contact identifier. These sets may nonetheless be mapped to the contact identifier, and, in some embodiments, may be displayed to a user as candidate sets of contact-related information as discussed below.

At 440, a confidence of association between a contact identifier and information associated with a contact may be determined. A confidence of association (e.g., confidence level, likelihood of association, certainty of association, probability of association) between a contact identifier and contact-related information may represent a confidence, likelihood, certainty, and/or probability that the contact identifier is associated with, related to, and/or corresponds to the contact-related information. A confidence of association value may include a number, scalar, percentage, array of numbers, and/or any other value. One or more confidence of association values may be, for example, included in an array, vector, and/or matrix of values.

A confidence of association between a contact identifier and contact-related information may be determined using various approaches. In some embodiments, a user of a mobile application may authenticate into a source (e.g., one or more of sources 120-128 of FIG. 1). Once authenticated, data associated with the user's account may be used to determine a confidence of association between contact identifier(s) and contact-related information from the source. For example, a user may authenticate (e.g., sign in) into a social network service. Once authenticated, a query may be performed against the user's connections to retrieve information associated with one or more contacts. In some cases, a user may be connected to a contact (e.g., friends with the contact) in the social network, and a query may be performed against the contact's profile to ascertain information that may increase or decrease the confidence of association between the contact identifier and information associated with the contact.

In some embodiments, upon authentication into a social network by a user, a query may be performed against that user's account to determine email address(es) associated with the user. And, a confidence of association may be generated between any retrieved email address(es) and the social network account. In this case, the confidence of association between a retrieved email address and the social network account information would be high because the user has listed the email address in the social network account profile.

In some embodiments, the confidence and association information described in the preceding paragraph may be used in future searches associated with the user's email address. If, for example, another user inputs the contact identifier associated with the user, the system may use the previously determined confidence of association to quickly retrieve and display the social network account information.

In some embodiments, a user's actions in relation to contact-related information displayed in a mobile application may be used to determine the confidence of association. For example, information associated with a contact (e.g., information from a social network associated with the contact) may be displayed in a mobile application. If a user of the mobile application interacts with the displayed information (e.g., taps on the displayed information, scrolls through the information, etc.), it may be determined that the information matches the contact identifier. Based on the determined match, the confidence of association between the contact identifier and the displayed information associated with the contact may be assigned a high value. The determination of confidence of association values is discussed in further detail below.

At 450, contact-related information may be selected based at least in part on confidence of association values. As discussed above, one or more sets of information may be retrieved based on a search/query against the plurality of sources. One or more of the retrieved sets of information may be selected (e.g., selected for display) based on the confidence of association values corresponding to the sets of information. In various embodiments, confidence of association values may be compared to a threshold value, and set(s) of contact-related information corresponding to confidence values that are above the threshold value may be selected. For example, in the event that a confidence of association between a contact identifier (e.g., an email address) and a set of contact-related information (e.g., information from a contact's social network account) is above a threshold (e.g., 0.9), the set of contact-related information may be selected.

According to some embodiments, no confidence of associated values for sets of contact-related information from a source may be above a threshold. In that case, one or more candidate sets of contact-related information may be selected for display to a user along with a request for confirmation. Selection of contact-related information based on confidence of association values is discussed in further detail below.

In some embodiments, the selected sets of information may be provided for display (e.g., on mobile device 102 of FIG. 1).

At 460, a contact identifier, information associated with a contact, and/or confidence(s) of association may be stored. In some embodiments, a contact identifier may be stored in a database along with contact-related information determined to be associated with the contact identifier. The database may also include confidence(s) of association between the contact identifier and each set of contact-related information. In the example shown below in Table 1, a contact identifier (e.g., an email address jsmith@xyz.com) may be determined to be associated with (e.g., mapped to) one or more social network accounts (e.g., Jane Smith ID_1234, Jane Smith ID_2468), a CRM service account (e.g., JaneSmith_xyz1), and/or other sets of contact-related information. Each of the sets of contact-related information may include a corresponding confidence of association. For example, a confidence of associate between the social network account Jane Smith ID_1234 and the email address jsmith@xyz.com may be 0.8, and this value may be stored along with the social network account. Another contact identifier (e.g., bob@acme.com) may be determined to be associated with a social network account (e.g., Bob Jones ID_1), a CRM service account (e.g., BobJones_Acme23), and/or other sets of contact-related information.

TABLE 1

Example contact-related information data structure.

| Contact Identifier | Business Contact Network Service (e.g., Social Network) | | CRM Service | |
|---|---|---|---|---|
| jsmith@xyz.com | Jane Smith ID_1234 | 0.8 Jane Smith ID_2468 | 0.3 JaneSmith_xyz1 | 0.9 |
| bob@acme.com | Bob Jones ID_1 | 0.7 | BobJones_Acme23 | 0.8 |

In some embodiments, a database of contact identifier, contact-related information, and/or confidence of association values may be searched/queried for contact-related information. For example, an expression of interest in a contact identifier may be received at a mobile device, and the database may be queried to retrieve information associated with a contact (e.g., a contact associated with the contact identifier). In some embodiments, the database may be searched in conjunction with a search of the plurality of sources.

According to some embodiments, one or more of steps 400-460, or any combination thereof, may be performed iteratively, recursively, and/or repeatedly. For example, as discussed further below, contact-related information from a first source may be used to search and retrieve contact-related information from one or more other sources. The information retrieved from other sources may be used to update mappings of the contact identifier to contact-related information from other sources. The confidence of association values between the contact identifier and contact-related information from other sources may also be updated based on the updating mapping. And, one or more of these steps may be performed recursively, iteratively, and/or repeatedly as new contact-related information is retrieved.

In some embodiments, the processes disclosed herein (e.g., as disclosed in each of the flowcharts included in the disclosure) may be performed passively (e.g., in the background, without any indication to a user). For example, searches may be performed, contact-related information may be retrieved, mappings may be updated, and/or other steps may be performed (e.g., continuously, in the background, etc.) without input from a user.

Figure 5:
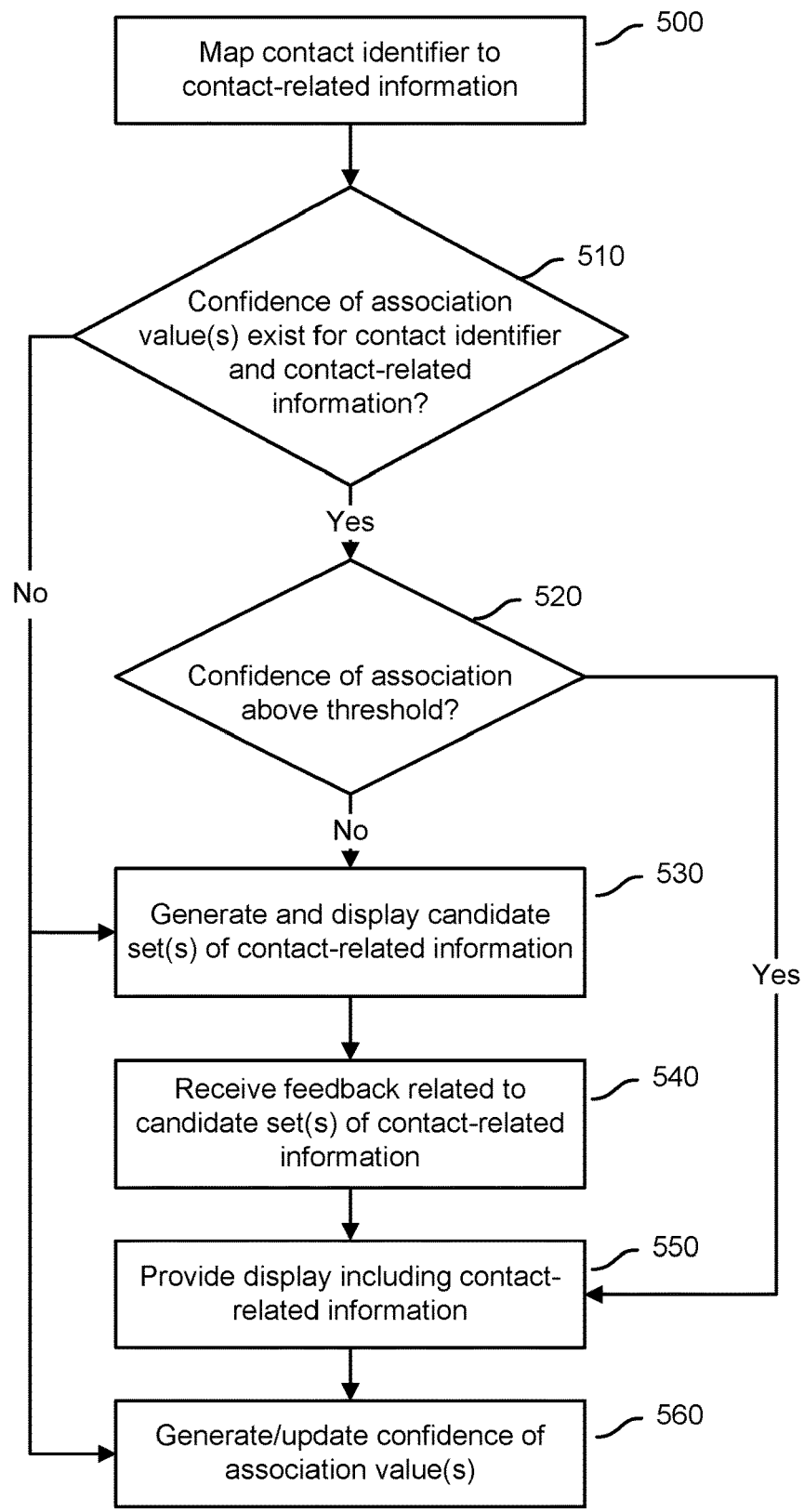
FIG. 5 is a flowchart illustrating embodiments of a process of determining confidences of association between a contact identifier and contact-related information.

FIG. 5 is a flowchart illustrating embodiments of a process of determining confidences of association between a contact identifier and contact-related information. In some embodiments, the process is performed by system 100 depicted in FIG. 1. At 500, a contact identifier may be mapped to information associated with a contact. The process of mapping a contact identifier to contact-related information is discussed in detail above.

At 510, it may be determined whether a confidence of association exists for the contact identifier and contact-related information (e.g., a set of information associated with a contact). In some embodiments, it may be determined that a confidence of association value exists between a contact identifier and a set of contact-related information based on a query of a contact-related information database (e.g., contact repository 112 of FIG. 1). In the event a confidence of association value does not exist (e.g., has not been generated) for the contact identifier and the contact-related information, the process may proceed to step 530 and/or step 560 as discussed below. In the event a confidence of association value exists, the process may proceed to step 520.

At 520, it may be determined whether confidence of association value(s) for the contact identifier and contact-related information are above a threshold. In some embodiments, confidence of association between a contact identifier and contact-related information may be represented by one or more numbers, percentages, and/or other values. For example, confidence of association values may be values between 0.0 and 1.0, wherein 0.0 indicates zero or minimal likelihood of association and 1.0 indicates a high (e.g., substantially certain) likelihood of association. In some cases, a threshold confidence of association value may be determined such that all values above the threshold indicate a high likelihood (e.g., a substantial certainty) of a match between the contact identifier and the contact-related information. The threshold value may be a predetermined threshold, dynamic threshold (e.g., a varying threshold value determined based on one or more confidence of association values), and/or other type of threshold. In the case that a confidence of association between a contact identifier and contact-related information is above the threshold, it may be determined that the contact identifier matches and/or corresponds to the contact-related information. In this case, the contact-related information may be determined to automatically match the contact identifier (e.g., without input and/or verification from a user), and the process may proceed to step 550. Alternatively, if the confidence of association for the contact identifier and contact-related information is not above the threshold, the process may proceed to step 530.

At 530, one or more candidate sets of contact-related information (e.g., possible mappings of contact-related information, potential matches) may be selected for display. In some embodiments, the candidate sets may be provided for display along with a request for feedback.

According to various embodiments, a search against a source for contact-related information may return multiple sets of contact-related information, and each of the sets of contact-related information may be associated with a confidence of association that is below a threshold. In this case, one or more candidate sets of contact-related information may be selected and provided for display. The candidate sets of contact-related information may be sets of contact-related information that partially match, substantially match, and/or are weakly related to a contact identifier. For example, a search based a contact identifier of the email jsmith@xyz.com against a business contact network may return multiple accounts including Jane Smith ID_2468 (e.g., Jane Smith, President at ABC Corp.); Jane Smith ID_3579 (e.g., Jane Smith, CEO at Jane, Inc.); Jane Smith ID_1234 (e.g., Jane Smith, Manager, XYZ Corp.), and/or other sets of contact-related information. In the event the confidence of association values associated with each of the accounts are below a threshold, one or more of the accounts may be displayed as candidate accounts. The candidate accounts may, in various embodiments, be displayed along with a prompt for feedback (e.g., a display requesting a user to select one of the candidate accounts).

According to various embodiments, a search against a source for contact-related information may return multiple sets of contact-related information, and a plurality of the sets of contact-related information may be associated with confidence of association values above a threshold. In this case, multiple sets of contact-related information may appear to match the contact identifier, and it may be necessary for a user to select a set of contact-related information that matches the contact identifier. One or more of the sets of contact-related information associated with high confidence of association values may be provided for display as candidate sets of contact-related information along with a prompt for feedback (e.g., a display requesting a user to select one of the candidate accounts).

Figure 6:
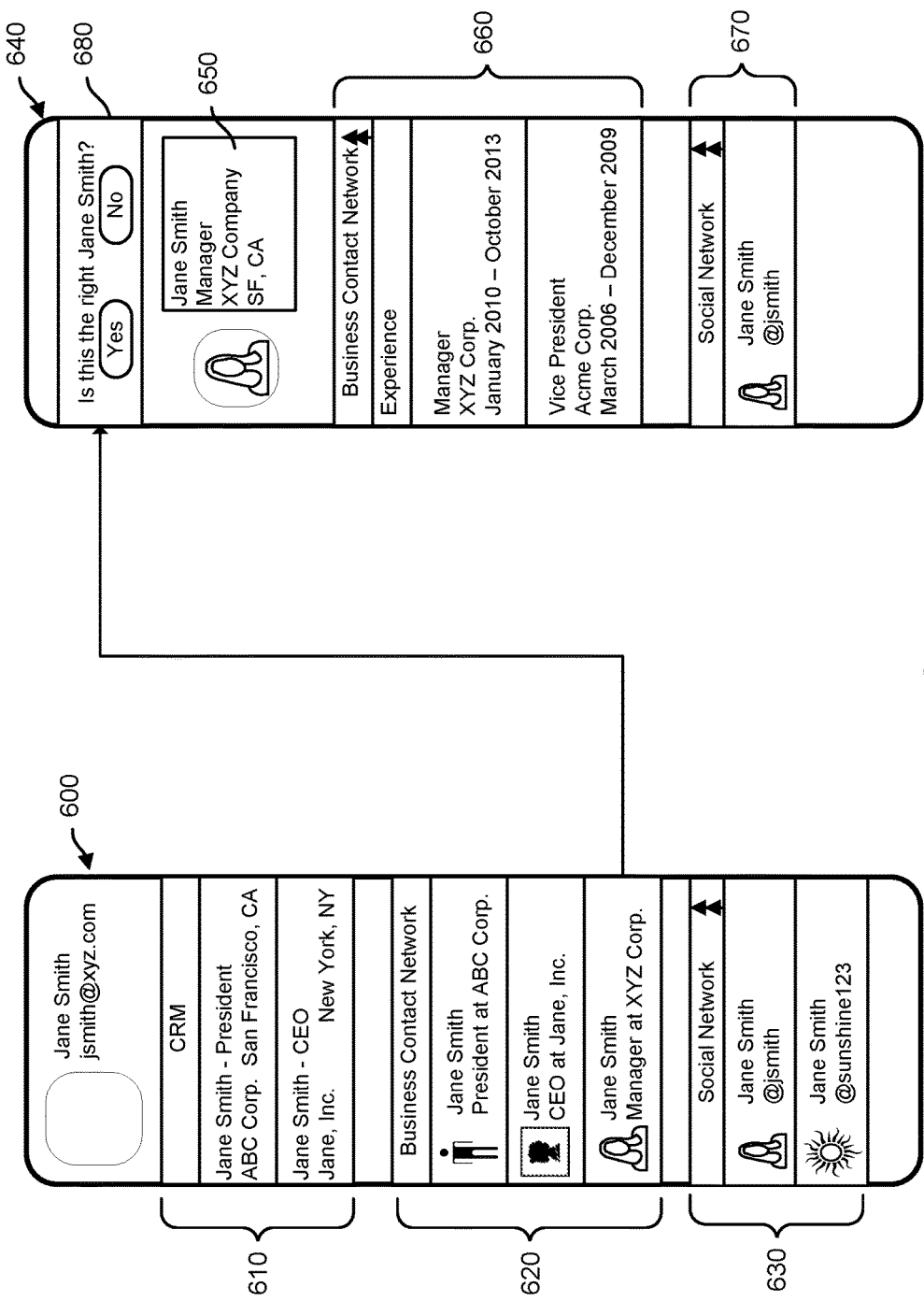
FIG. 6 is a diagram depicting an example display of contact-related information on a mobile device.

An example display including candidate sets of contact-related information according to various embodiments is depicted in FIG. 6, discussed below.

At 540, an indication of feedback related to the displayed contact-related information may be received. An indication of feedback may include an indication of validation, an indication of rejection, and/or other types of feedback. An indication of validation may include input from a user (e.g., user interaction with a display including contact-related information), an absence of input from a user, an affirmative validation of the contact-related information, and/or any other type of validation. For example, an indication of validation of contact-related information may be received when a user interacts with displayed contact-related information by swiping through displayed information. In some cases, a user may indicate validation or rejection of contact-related information by not interacting with the contact-related information, which may, in certain cases, represent silent and/or implied validation or rejection of the accuracy of contact-related information.

In some embodiments, one or more candidate sets of contact-related information may be output with a prompt for selection of one or more of the candidate sets. In this case, an indication of feedback may be received when a user selects one or more of the candidate sets of contact-related information.

In some embodiments, an indication of rejection may be received. An indication of rejection may include, for example, an indication that a user is searching for additional contact-related information other than the displayed contact-related information, a user action to exit the application and/or content display, and/or any other indication of rejection. The indication of feedback information may be used in step 560, discussed below, to update a confidence of association value for the contact identifier and the displayed contact-related information. In some embodiments, step 540 may be optional and feedback information may not be received.

At 550, a display may be provided that includes the contact-related information. In some embodiments, based on a determination that a contact identifier is automatically matched to a set of contact-related information (e.g., as discussed in step 520), a display may be provided that includes the set of contact-related information.

In various embodiments, upon receiving feedback in step 540 (e.g., an indication of acceptance or rejection and/or other feedback) relating to the display of contact-related information, additional contact-related information may be selected and provided for display. For example, a user may provide feedback (e.g., in step 540) by selecting a candidate set of contact-related information (e.g., a summary of contact-related information associated with a person). Based on the user's selection, an additional set of contact-related information (e.g., a full contact detail view associated with the person) may be provided for display.

At 560, confidence of association values may be updated and/or generated. In some embodiments, a confidence of association value between a contact identifier and set of contact-related information may be updated based on an indication of feedback from a user and/or other actions. The confidence of association value may be increased according to the following example formula, in which $C_n$ represents an updated confidence of association value, $C_o$ represents a prior confidence of association value, and B represents a boost factor (e.g., increase factor).

$$C_n=C_o+B(1-C_O)$$

As discussed above in relation to steps 530, a display may be provided that includes the contact-related information (e.g., information from the social network account). In the event a user does not reject (e.g., performs no action related to) an automatically matched set of contact-related information, the confidence of association between the set of contact-related information and the contact identifier may be increased according to the above formula, wherein the boost factor B may be equivalent to 0.1.

As discussed above in relation to step 540, in various embodiments, one or more candidate sets of contact-related information (e.g., social network account information, CRM user account information, etc.) may be output with a prompt for a user to select (e.g., validate) one or more of the sets. In the event that a user selects a set of contact-related information, which may indicate that the set of contact-related information matches a contact identifier, a confidence of association value between the contact identifier and that set of contact-related information may be increased. In the case of a user providing feedback indicating a match, the confidence of association may be increased according to the above formula, wherein the boost factor B may be equivalent to 0.25.

In some embodiments, a confidence of association value may be decreased according to the following example formula, in which $C_n$ represents an updated confidence of association value, $C_o$ represents a prior confidence of association value, and R represents a reduction factor.

$$C_n=\max(C_o-\max(R(1-C_O),R/10),0)$$

In some embodiments, one or more candidate sets of contact-related information (e.g., social network account information, CRM user account information, etc.) may be output with a prompt for a user to select (e.g., validate) one or more of the sets. In the event an indication of rejection is received (e.g., a user does not select a set, rejects a set, deselects a set), a confidence of association corresponding to the set of contact-related information may be reduced according to the formula directly above, wherein the reduction factor R may be equivalent to, for example, 0.34.

Other techniques and formulas may of course be used to adjust confidence of association values between a contact identifier and contact-related information (e.g., sets of contact-related information).

In some embodiments, the confidence of association between contact identifiers and sets of contact-related information may be updated based on feedback from multiple users across multiple mobile devices. Using these techniques, candidate mappings between contact identifiers and sets of contact-related information may be evaluated by large groups of users (e.g., crowd sourced) to improve the accuracy of confidence of association values and ultimately the contact-related information displayed to a user. Based on the wisdom of the crowd, the system may quickly generate accurate mappings between contact identifiers and sets of contact-related information. For example, a user may not know whether contact-related information from a source is associated with the contact identifier. Through the user's actions (e.g., feedback related to the contact-related information), and the collective actions of all users, the system may determine the best possible mapping (e.g., match) between the contact identifier and contact-related information and may automatically present the matching contact-related information to the user.

FIG. 6 is a diagram depicting an example display of contact-related information on a mobile device. A display 600 may include multiple candidate sets of contact-related information from one or more sources. According to some embodiments, a search of a source for information associated with a contact identifier may return multiple sets of contact-related information, and one or more candidate sets of contact-related information may be provided for display. For example, a CRM service may be searched based on the contact identifier (e.g., email address (jsmith@xyz.com)), and multiple CRM user accounts 610 (e.g., Jane Smith, President ABC Corp.; Jane Smith, CEO Jane Inc.) may be returned. Similarly, a business contact network service may be searched (e.g., simultaneously) based on the contact identifier, and multiple business contact network accounts 620 (e.g., Jane Smith, President at ABC Corp.; Jane Smith, CEO at Jane Inc.; Jane Smith, Manager at XYZ Corp.) may be returned. A social network service may also be searched (e.g., simultaneously) based on the contact identifier, and multiple social network accounts 630 (e.g., @jsmith, @sunshine123) may be retrieved. As discussed above with reference to FIG. 5, the sets of contact-related information may (e.g., the CRM user accounts 610, business contact network accounts 620, social network accounts 630) may be determined to be candidate sets of contact-related information, and the candidate sets of contact-related information may be provided for display. In some embodiments the candidate CRM accounts 610, business contact network accounts 620, and/or social network accounts 630 may be displayed along with a prompt for a user to select matching account(s). An indication of feedback may be received when, for example, a user selects a set of contact-related information (e.g., a business contact network account). In this case, the business contact network account for Jane Smith, Manager at XYZ Corp. may be selected, and a display including additional information from the account may be provided in a contact detail display 640.

In some embodiments, the contact detail display 640 may include, for example, a contact-related information summary 650 (e.g., a photograph, contact name, job title, company, city, etc.), a candidate set of contact-related information 660 (e.g., the business contact network account for Jane Smith, Manager at XYZ Corp.), contact-related information from a set of contact-related information associated with the candidate set 670 (e.g., the social network account @jsmith), and/or a prompt 680 for verification of the set of contact-related information. The prompt 680 may include a request for verification (e.g., "Is this the right Jane Smith?") of the set of contact-related information and buttons for user input (e.g., Yes and No buttons). An indication of feedback may be received when a user selects yes (e.g., validation of the contact-related information), no (e.g., rejection of the contact-related information), and/or other indications of feedback. A confidence of association between the contact identifier (e.g., jsmith@xyz.com) and the set of contact-related information 660 (e.g., Jane Smith, Manager at XYZ Corp.) may be updated based on the indication of feedback.

Figure 7:
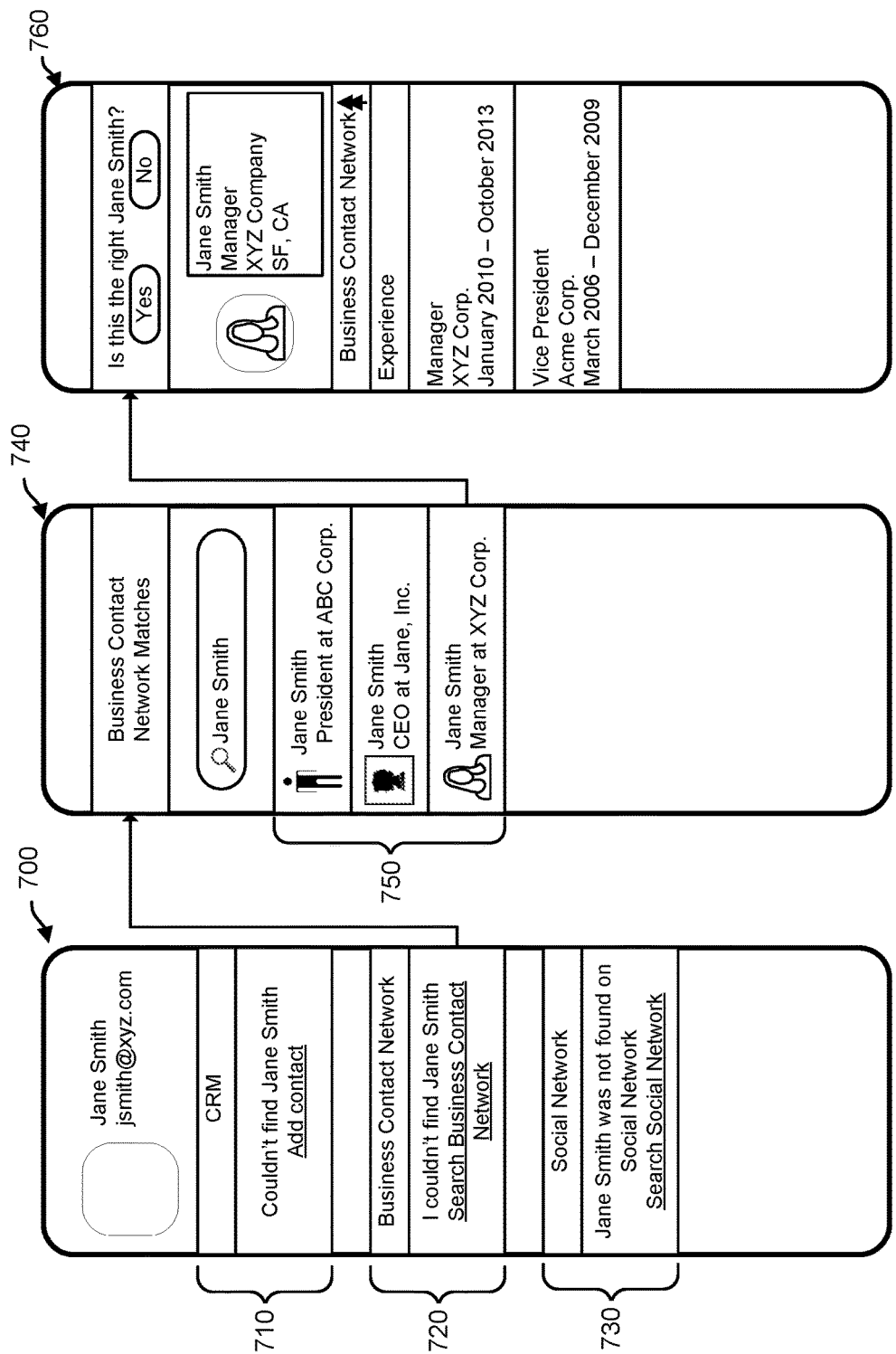
FIG. 7 is a diagram depicting an example display of contact-related information on a mobile device.

FIG. 7 is a diagram depicting an example display of contact-related information on a mobile device. In some embodiments, a search of a source for information associated with a contact identifier may return no matching sets of contact-related information. A display 700 may be provided that includes, for example, links to search one or more sources. The display 700 may include, for example, links to search a CRM service 710, a business contact network 720, a social network 730, and/or other sources. In some embodiments, a user may provide input to search a business contact network for information related to a contact, and a search display 740 may be provided. One or more sets of contact-related information 750 may be displayed based on a query. An indication of feedback may be received when, for example, a user selects a set of contact-related information 750.

In some embodiments, a contact detail display 760 may be provided based on user selection of a set of contact-related information 750 in the search display 740. Similar to contact detail display 640 of FIG. 6, the contact detail display 760 may include, for example, a contact-related information summary (e.g., a photograph, contact name, job title, company, city, etc.), a candidate set of contact-related information (e.g., the business contact network account for Jane Smith, Manager at XYZ Corp.) and/or a prompt for verification of the set of contact-related information.

Figure 8:
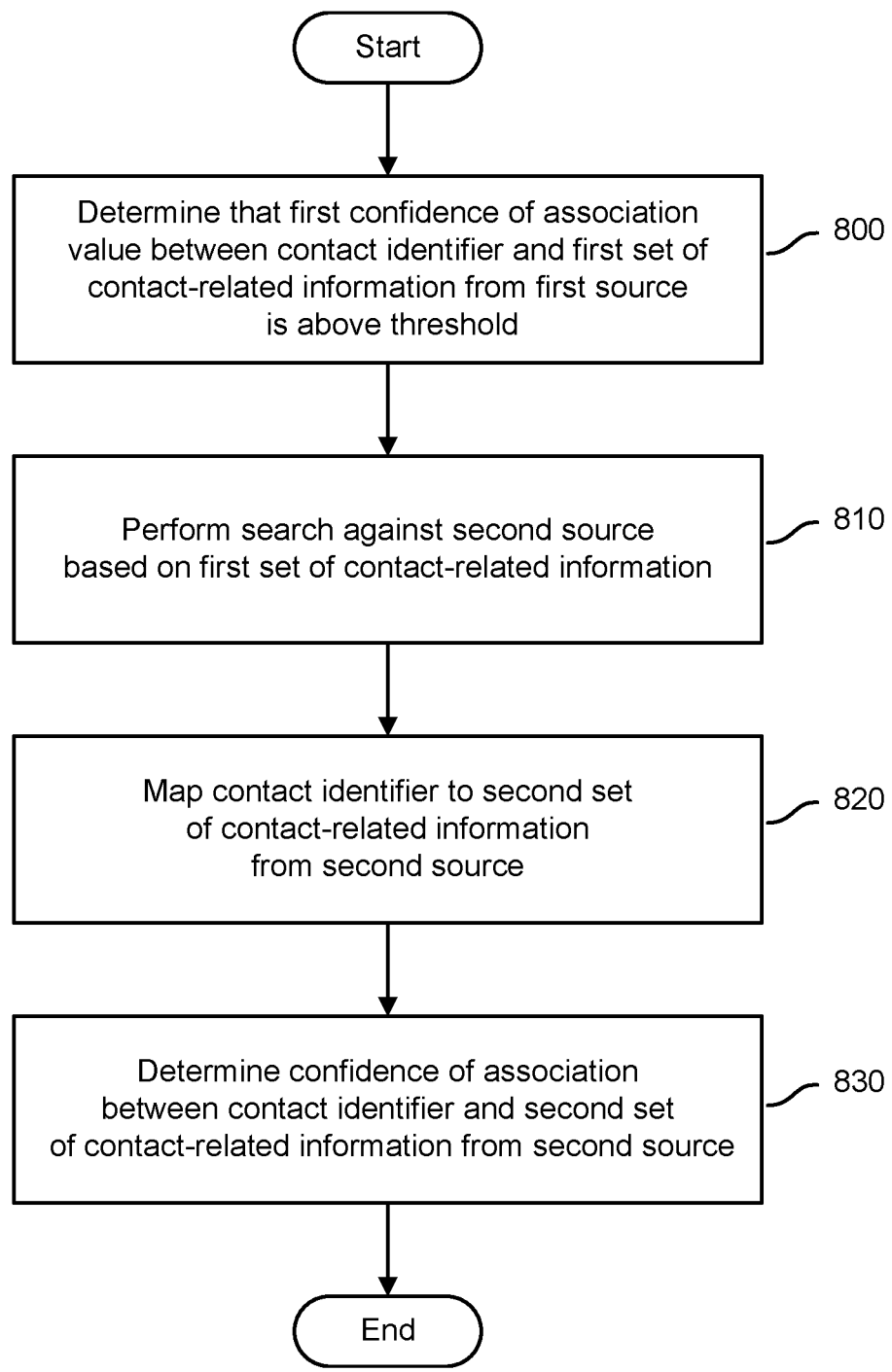
FIG. 8 is a flowchart illustrating embodiments of a process of automatically determining confidences of association between a contact identifier and contact-related information.

FIG. 8 is a flowchart illustrating embodiments of a process of automatically determining confidences of association between a contact identifier and contact-related information. In some embodiments, the process is performed by system 100 depicted in FIG. 1. At 800, it may be determined that a first confidence of association value between a contact identifier and a first set of contact-related information from first source is above a threshold. For example, a contact identifier (e.g., an email address jsmith@xyz.com) may be mapped to a first set of contact-related information (e.g., a user account Jane Smith ID_1234) from a first source (e.g., a business contact network service). A confidence of association between the contact identifier and the contact-related information from the first source may be generated and/or updated. The confidence of association value may be compared to a threshold value (e.g., 0.9), and it may be determined that the confidence of association value is above a threshold value. Because the confidence of association value is above the threshold, the mapping between the contact identifier (e.g., the email address jsmith@xyz.com) and the first set of information (e.g., a user account Jane Smith ID_1234) may be determined to be a confident mapping (e.g., a highly confident mapping). As a result, in various embodiments, future searches (e.g., on other mobile devices) using the email address jsmith@xyz.com against the first source (e.g., the business contact network service) may automatically return the first set of contact-related information (e.g., data from the business contact network account Jane Smith ID_1234)).

According to some embodiments, data from the first set of contact-related information from the first source may be used to improve searches against other sources (e.g., CRM services, social networks, other business contact networks, enterprise data, etc.).

At 810, a search (e.g., query) may be performed against a second source based at least in part on the first set of contact-related information from the first source. For example, the first set of contact-related information (e.g., a contact name, location, employer, interests, keywords associated with the contact, and/or any other contact related information) may be used as parameters to search(es) against a second source. For example, a contact name (e.g., Jane Smith), location (e.g., San Francisco, Calif.), company (e.g., XYZ Corp.), and/or other information from a business contact network account Jane Smith ID_1234 may be used as search parameters/terms in quer(ies) against a social network service.

At 820, the contact identifier may be mapped to a second set of contact-related information from the second source. A search against the second source may retrieve a second set of contact-related information, and the second set of contact-related information may be mapped to the contact identifier. Continuing with the example, information from the business contact network account Jane Smith ID_1234 (e.g., the name Jane Smith, location San Francisco, Calif., company XYZ Corp., etc.) may be used as parameters in a search against a social network service. And, the search may return a second set of contact-related information—a social network service account for @janesmith. The social network service account for @janesmith may be mapped to the contact identifier jsmith@xyz.com.

At 830, a confidence of association may be determined between the contact identifier and the second set of contact-related information from the second source. In some embodiments, a confidence of association value between the contact identifier and the second set of contact-related information from the second source may be determined using any of the techniques for determining confidence of association discussed herein and/or known in the art. In some embodiments, the confidence of association between the contact identifier and the second set of contact-related information may be determined based on a level of similarity between the first set of contact-related information and the second set of contact-related information. If, for example, the first set of contact-related information (e.g., a business contact network account Jane Smith ID_1234) and the second set of contact-related information (e.g., a social network profile @janesmith) both include substantially similar information (e.g., the name Jane Smith, the location San Francisco, Calif., the company XYZ Corp., and/or other information), the confidence of association between jsmith@xyz.com and @janesmith may be determined to be high.

In some embodiments, sets of contact-related information from different sources may be determined to be related to one another. And, information representing the relationship between the multiple related sets of contact-related information from separate sources may be stored. For example, a first set of contact-related information from a social network (e.g., the social network account identified by @jansemith) may be determined to be related to or associated with a second set of contact-related information from business contact network account (e.g., the account identified by Jane Smith ID_1234). The relationship between the two sets of contact-related information (e.g., accounts) may indicate, for example, that the two sets are both associated with the same person, and/or entity. An indication of the relationship between the two sets may be stored for use in future searches.

Figure 9:
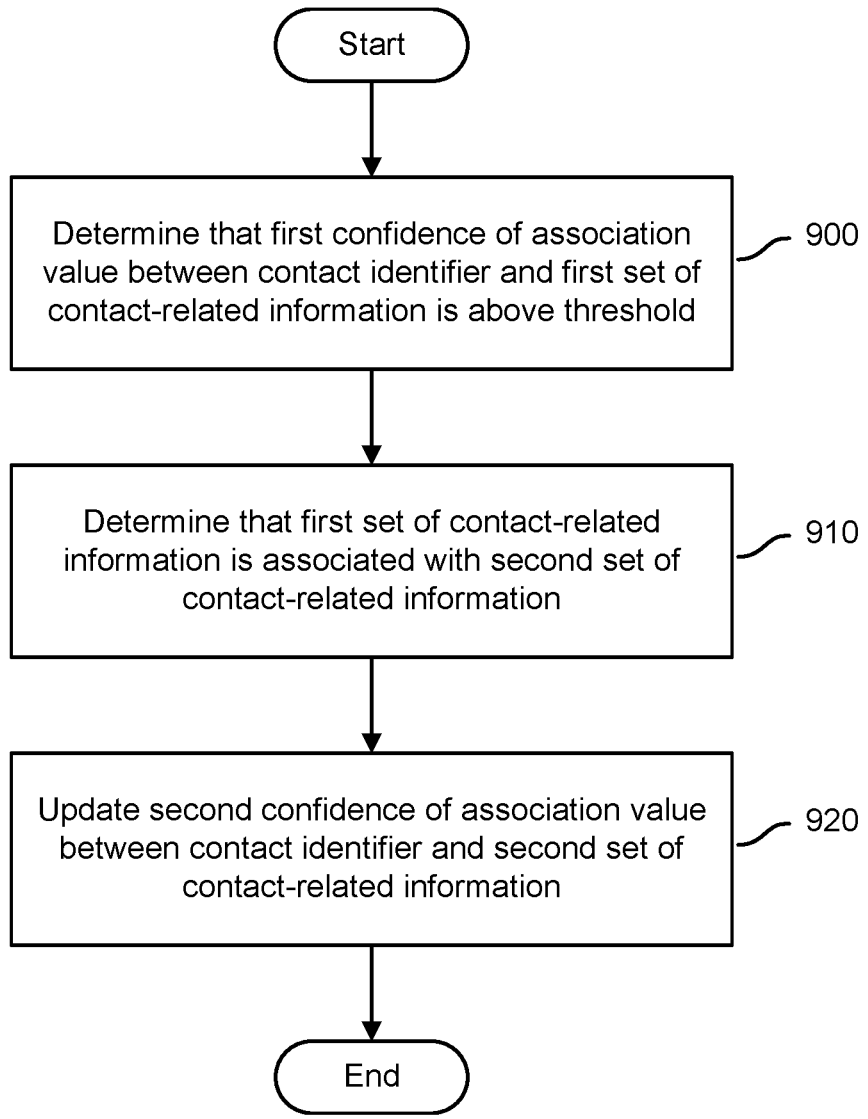
FIG. 9 is a flowchart illustrating embodiments of a process for updating confidence of association values.

FIG. 9 is a flowchart illustrating embodiments of a process for updating confidence of association values. In some embodiments, the process is performed by system 100 depicted in FIG. 1. At 900, it may be determined that a first confidence of association value between a contact identifier and a first set of contact-related information from first source is above a threshold. Employing the example discussed in relation to FIG. 8, it may be determined that the confidence of association between a contact identifier (e.g., an email address jsmith@xyz.com) and a first set of contact-related information (e.g., a business contact network account Jane Smith ID_1234) is above a threshold (e.g., 0.9).

At 910, it may be determined that the first set of contact-related information is associated with a second set of contact-related information. In some embodiments, the first set of contact-related information, which is associated with a high confidence of association value, may be compared to one or more sets of contact-related information, which are associated with lower confidence of association values. A level of similarity between the first set of contact-related information and a second set of contact-related information may be determined. If, for example, the first set of contact-related information (e.g., a business contact network account Jane Smith ID_1234) and the second set of contact-related information (e.g., a social network profile@janesmith) both include substantially similar information (e.g., the name Jane Smith, the location San Francisco, Calif., the company XYZ Corp., and/or other information), the similarity between the first set and second set may be determined to be high. Alternatively, if the first and second sets of contact-related information do not include substantially similar (e.g., overlapping, matching) information, the similarity between the first and second values may be determined to be low.

At 920, a second confidence of association between the contact identifier and a second set of contact-related information may be updated. In some embodiments, a confidence of association between a contact identifier and a second set of contact-related information may be updated based on a similarity between the second set of contact-related information and the first set of contact-related information. A confidence of association between the contact identifier and the first set of contact-related information may be determined to be high, and the confidence of this match may be leveraged to adjust (e.g., strengthen or weaken) the confidence of association between the contact identifier and other sets of contact-related information. For example, if the first set of a contact-related information (e.g., a business contact network account Jane Smith ID_1234) and the second set of contact-related information (e.g., a social network profile@janesmith) are determined to be similar, the confidence of association between the contact identifier (e.g., the email address jsmith@xyz.com) and the second set of contact-related information may be increased. Similarly, if the first set and second set are dissimilar, the confidence of association between the contact identifier and the second set of contact-related information may be decreased.

Figure 10:
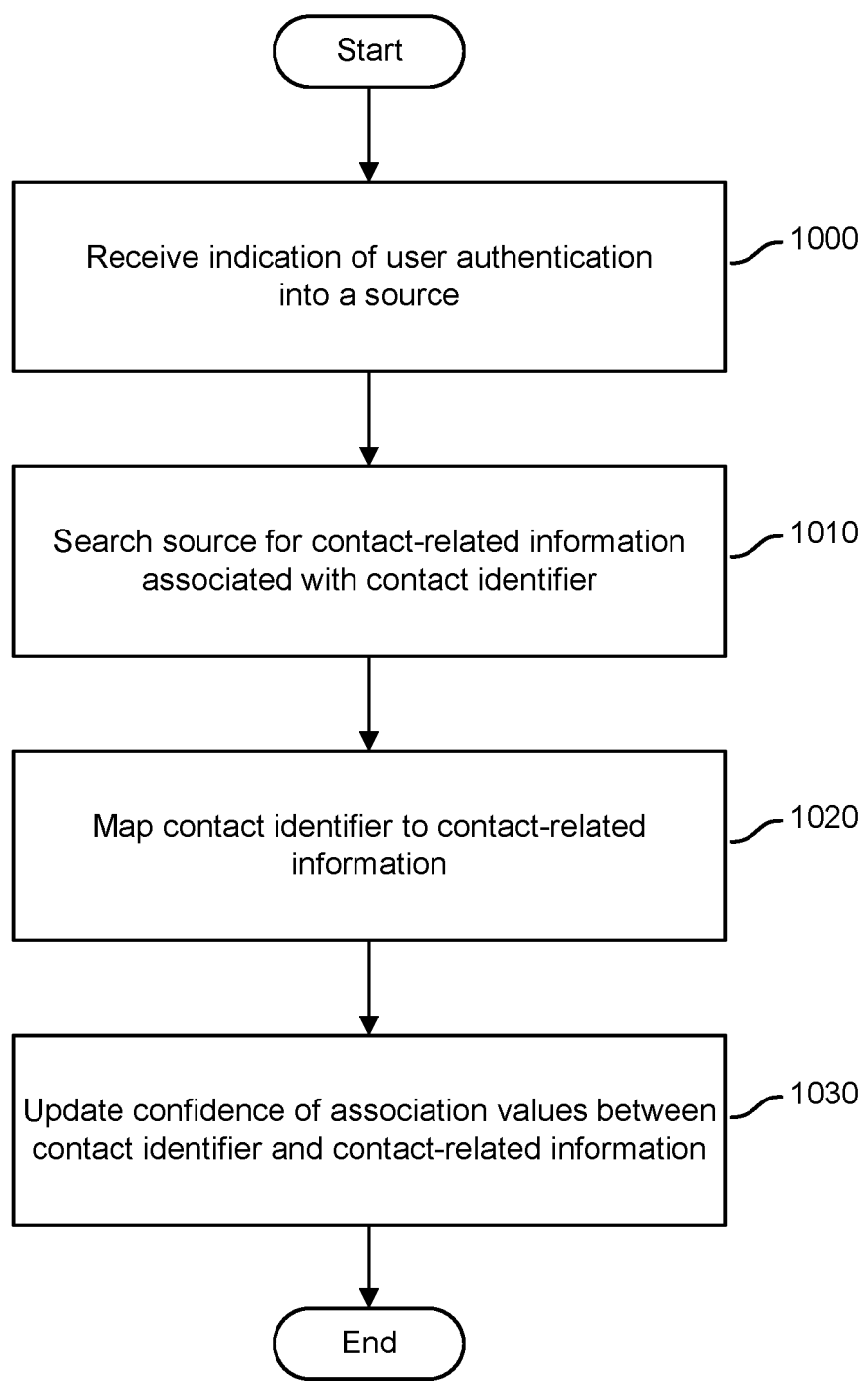
FIG. 10 is a flowchart illustrating embodiments of a process for updating confidence of association values.

FIG. 10 is flowchart illustrating embodiments of a process for updating confidence of association values. At 1000, an indication may be received that user (e.g., a mobile device user) has authenticated into source. In some embodiments, a user may authenticate into a source (e.g., a social network account, business contact network account, a CRM account, email account, etc.) by signing into the account.

At 1010, the source may be searched for contact-related information associated with a contact identifier. In some embodiments, upon authentication to a data source, a user may have increased search privileges. Utilizing these expanded privileges, automatic searches may be generated against the data source to retrieve contact-related information related to one or more contact identifiers. For example, an authenticated user's connections in a source (e.g., contacts in a business contact network) may be queried to retrieve contact-related information that may be used to map the contact-related information to a contact identifier. In some embodiments, one or more contact identifiers (e.g., email address in a user's address book) may be used to perform queries against the user's connections in the data source.

At 1020, a contact identifier may be mapped to contact-related information from the source. In some embodiments, the contact identifier-based queries against the data source may return contact-related information associated with the contact identifier. The retrieved contact-related information may be mapped to the contact identifier and stored in a repository.

At 1030, confidence of association values between the contact identifier(s) and the contact-related information may be generated and/or updated. In some embodiments, the contact-related information may be mapped to contact-related information from the source for a first time and a new confidence of association value may be generated and stored. In various embodiments, the confidence of association value between a contact identifier and contact-related information mapped based on user authentication into a source may be higher than mappings generated using other techniques.

In various embodiments, a confidence of association between a contact identifier and contact-related information from the authenticated source may be updated based on the authenticated mapping. As discussed above, the confidence of association value, in some embodiments, may be increased according to the following formula, in which $C_n$ represents an updated confidence of association value, $C_o$ represents a prior confidence of association value, and B represents a boost factor (e.g., increase factor).

$$C_n = C_o + B(1 - C_O)$$

In the case of a mapping generated based on data retrieved from user's authentication into source, the confidence of association may be increased according to the above formula, wherein the boost factor B may be equivalent to 0.9.

Figure 11:
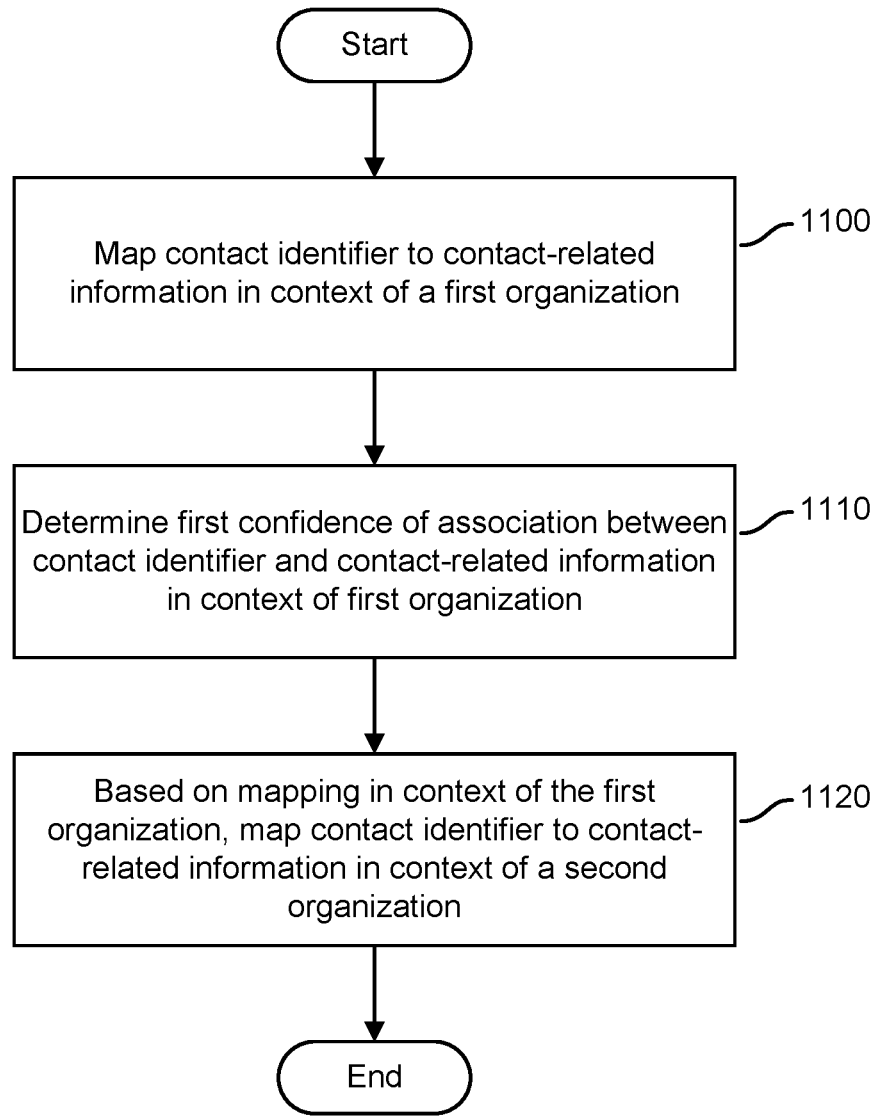
FIG. 11 is a flowchart illustrating embodiments of a process for mapping contact-related information across organizations.

FIG. 11 is a flowchart illustrating embodiments of a process for mapping contact-related information across organizations. In some embodiments, the process is performed by system 100 depicted in FIG. 1. At 1100, a contact identifier may be mapped to contact-related information in the context of a first organization. In various embodiments, a user (e.g., a mobile device user) associated with a first organization (e.g., a company, government entity, group, and/or any other type of entity) may be authenticated into a system (e.g., system 100 of FIG. 1). A search may be performed, in the context of the first organization (e.g., by the user associated with first organization) against a plurality of sources for contact-related information associated with a contact identifier. Based at least in part on the search, the contact identifier may be mapped to contact-related information retrieved from the plurality of sources.

For example, search(es) may be performed based on the email address jsmith@xyz.com, in the context of Alpha Corp. (e.g., on a mobile device application authenticated to an employee (e.g., Alan) of Alpha Corp.). The search(es) may be performed against public sources (e.g., a public social network, a business contact network, etc.), proprietary/confidential sources (e.g., CRM service accounts associated with Alpha Corp., content management system (e.g., SharePoint) accounts associated with Alpha Corp., etc.), and/or other sources. Based at least in part on the search(es), the email address jsmith@xyz.com may be mapped to contact-related information from public sources including, for example, the social network @jsmith, the business contact network Jane Smith ID_1234, and/or other contact-related information. The email address jsmith@xyz.com may also be mapped to contact-related information from proprietary sources including, for example, Jane Smith in Alan's CRM (ID 4321) and/or other contact-related information from proprietary sources.

In some embodiments, a context of an organization may affect access to contact-related information from proprietary sources, but the context may have minimal affect (e.g., no affect) on access to contact-related information from public sources. For example, the mappings to contact-related information from proprietary sources in the context of the Alpha Corp. organization may be proprietary to Alpha Corp. and may therefore be protected from disclosure to other organizations. As a result, users not associated with Alpha Corp. may not have access to the mapping of contact-related information from a source proprietary to Alpha Corp. (e.g., Alan's CRM account (ID 4321), which is proprietary to Alpha Corp.). As discussed below, however, the contact-related information from the proprietary source associated with a first organization may be used to affect, adjust, and/or influence confidence levels of other mappings in the context of a second organization without providing the second organization access to the first organization's proprietary contact-related information.

According to some embodiments, the mappings to contact-related information from public sources may not be access protected and these mappings may be freely accessed across different organizations.

At 1110, the first confidenc(es) of association between the contact identifier and contact-related information may be determined in the context of the first organization. In some embodiments, confidence of association values between the contact identifier (e.g., jsmith@xyz.com) and the sets of contact-related information (e.g., the social network g smith, the business contact network Jane Smith ID_1234, and Jane Smith in Alan's CRM (ID 4321)) may be determined in the context of the first organization (e.g., Alpha Corp.).

At 1120, based on the mapping(s) in the context of the first organization, the contact identifier may be mapped to contact-related information in the context of a second organization. In some embodiments, a search may be performed, in the context of a second organization (e.g., by a user associated with the second organization) against a plurality of sources for contact-related information associated with the same contact identifier. Based on the mapping of the contact identifier to sets of contact-related information in the context of the first organization, the contact identifier may be mapped to one or more sets of contact-related information in the context of the second organization. In some embodiments, mappings made in the context of a first organization may be leveraged to increase the accuracy of mappings in the context of a second organization.

Continuing with the example, a second set of one or more searches may be performed based on the email address jsmith@xyz.com, in the context of Beta Corp. (e.g., on a mobile device application authenticated to an employee (e.g., Ben) of Beta Corp.). A second search based on the email address jsmith@xyz.com may be performed, for example, in the context of Beta Corp. against public sources including the social network, the business contact network, and/or other sources. A second search may also be performed against proprietary sources including CRM service accounts associated with Beta Corp., content management system (e.g., SharePoint) accounts associated with Beta Corp., and/or other sources.

Based on the mapping of the email address jsmith@xyz.com to public sources in the context of Alpha Corp. including the social network g smith, the business contact network account Jane Smith ID_1234, and/or other sources, the email address jsmith@xyz.com may be mapped to the same public sources in the context of the Beta Corp. Because these sources are public, the mappings between jsmith@xyz.com and the contact-related information from public sources may be shared across organizations (e.g., between Alpha Corp. and Beta Corp.).

In some embodiments, Beta Corp. users (e.g., Ben) may not have access to the mapping of the email address jsmith@xyz.com to proprietary sources in the context of Alpha Corp. including, for example, the mapping to Jane Smith in Alan's CRM (ID 4321). Ben may also be prevented from accessing any of the contact-related information associated with Jane Smith in Alan's CRM (ID 4321). However, the contact-related information associated with Jane Smith in Alan's CRM (ID 4321) (e.g., name, telephone number, address, credentials, and/or other contact-related information associated with Jane Smith) may be used to map the email jsmith@xyz.com to a Jane Smith in Bob's CRM (ID 8765) without providing Bob access to Alpha Corp. proprietary information. Similarly, the contact-related information associated with Jane Smith in Alan's CRM (ID 4321) may be used in the context of Beta Corp. to map the email jsmith@xyz.com to contact-related information from other sources (e.g., content management system accounts, public sources, etc.). These operations may occur, for example, on back-end servers with no indication/notification provide to Beta Corp. and/or Alpha Corp. users.

Figure 12:
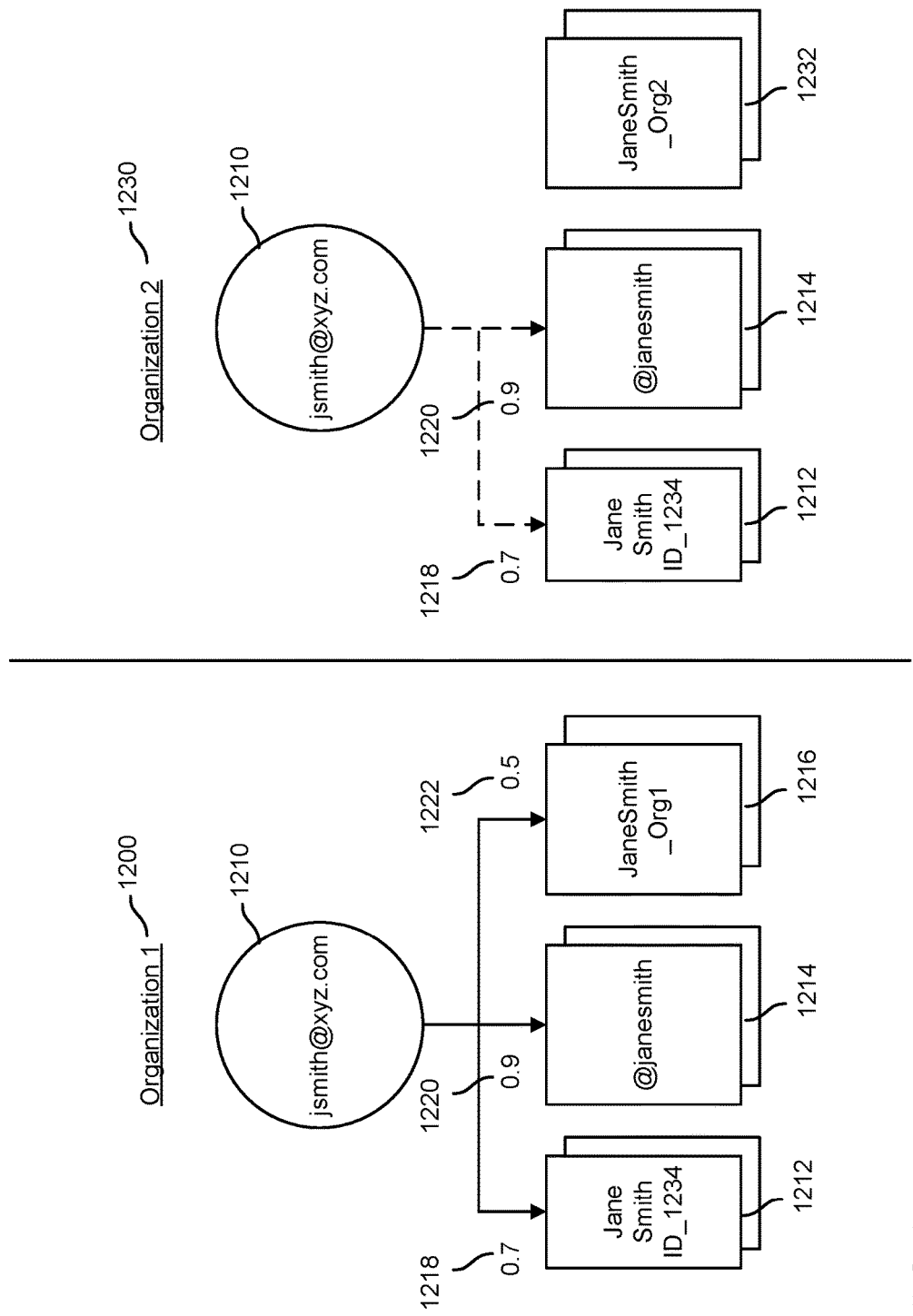
FIG. 12 is a diagram illustrating embodiments of a process for mapping contact-related information across organizations.

FIG. 12 is a diagram illustrating embodiments of a process for mapping contact-related information across organizations. In the context of a first organization 1200, a contact identifier 1210 (e.g., the email address jsmith@xyz.com) may be mapped to a contact-related information from public sources including a business contact network account 1212 (e.g., Jane Smith ID_1234), a social network account 1214 (e.g., @janesmith), and/or other contact-related information. The contact identifier 1210 may also be mapped to contact-related information from proprietary sources including a CRM account 1216 (e.g., Jane Smith in first organization's CRM account—Jane-Smith_Org1), and/or other contact-related information. Confidence of association values 1218-1222 may be calculated between the contact identifier 1210 and the sets of contact-related information 1212-1216, in the context of the first organization 1200.

Based on the mappings in the context of the first organization 1200, the contact identifier 1210 (e.g., the email jsmith@xyz.com) may be automatically mapped to contact-related information from public sources in the context of a second organization 1230. These public sources may include the business contact network account 1212 (e.g., Jane Smith ID_1234), the social network account 1214 (e.g., @janesmith), and/or other contact-related information from public sources, in the context of the second organization 1230.

In various embodiments, the confidence of association values 1218, 1220 determined in the context of the first organization may be used in the context of the second organization 1230 to determine sets of contact-related information 1212, 1214 for display in the context of the second organization.

According to some embodiments, information that is proprietary to one organization may not be displayed to users outside of the organization. For instance, many CRM systems are configured to record data about an entity (e.g., a person) and a separate entity (e.g., an organization) with which the first entity interacts (e.g., conducts business). Because there are multiple interactions between different entities over time, each entity (e.g., a person (e.g., Jane Smith), organization (e.g., XYZ Corp.), or any other entity)

may be associated with and recorded in multiple CRM systems. For example, one person (e.g., Jane Smith) may be recorded in a separate CRM for each person, organization, and/or entity with which the person interacts. As such, sets of contact-related information (e.g., CRM account information) that are accessible in the context of one organization may be proprietary to any other organization. Other organizations may, therefore, be blocked from accessing proprietary sets of contact-related information. In this case, the contact identifier 1210 (e.g., email jsmith@xyz.com) may not be mapped to the contact-related information from the first organization's CRM account 1216 (e.g., Jane-Smith_Org1) within the context of the second organization 1230. However, the contact-related information from the first organization's CRM account 1216 (e.g., Jane Smith in the first organization's CRM—JaneSmith_Org1) may affect the confidence levels of mappings between jsmith@xyz.com and other contact-related information in the context of the second organization 1230. For example, the contact-related information from the first organization CRM account Jane-Smith_Org1 may be used to search for contact-related information associated with jsmith@xyz.com in the context of the second organization 1230 without disclosing any information from the account JaneSmith_Org1 to the second organization 1230. Contact-related information from the first organization CRM account JaneSmith_Org1 may be used to map jsmith@xyz.com a second organization CRM account 1232 associated with Jane Smith (e.g., Jane-Smith_Org2).

Figure 13:
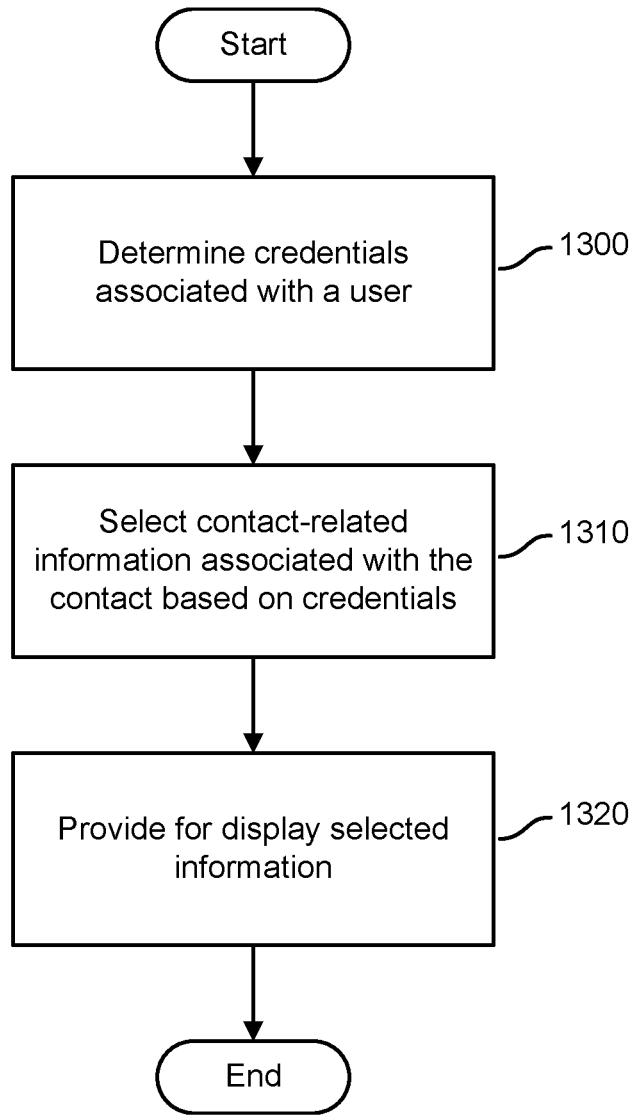
FIG. 13 is a flowchart illustrating embodiments of a process for determining contact-related information for display.

FIG. 13 is a flowchart illustrating embodiments of a process for determining contact-related information for display. In some embodiments, the process is performed by system 100 depicted in FIG. 1. At 1300, credentials associated with a user of the mobile application may be determined. In some embodiments, credentials associated with a user may include a job title, role, company, permission level (e.g., administrator, read-write), and/or other type of credentials. For example, a user may be associated with the credentials of a manager. A manager of an organization may, for example, have higher access privileges/permissions than an entry-level employee but less access than the president.

At 1310, contact-related information associated with a contact may be selected based on the credentials associated with a user. In some embodiments, a contact identifier may be mapped to contact-related information from a plurality of sources (e.g., an email account associated with the contact, a virtual card from enterprise storage, a CRM account associated with the contact, etc.). Contact-related information from the plurality of sources may be selected according to credentials associated with a user by selecting sets of contact-related information that the user has permission to view. For example, if the credentials associated with a user indicate that the user has a low level of access (e.g., the user is lower level employee), the sets of contact-related information may be filtered to only select information the user is authorized to view. For instance, a user associated with entry-level employee credentials may only be authorized to view minimal information associated with other employees of an organization, while a vice president may be authorized to view more information. By way of example, the contact-related information selected for display to an entry-level user may therefore be filtered to remove a contact's personal information.

At 1320, the selected information may be provided for display. The selected information may, for example, be displayed in the context of the mobile application.

Figure 14:
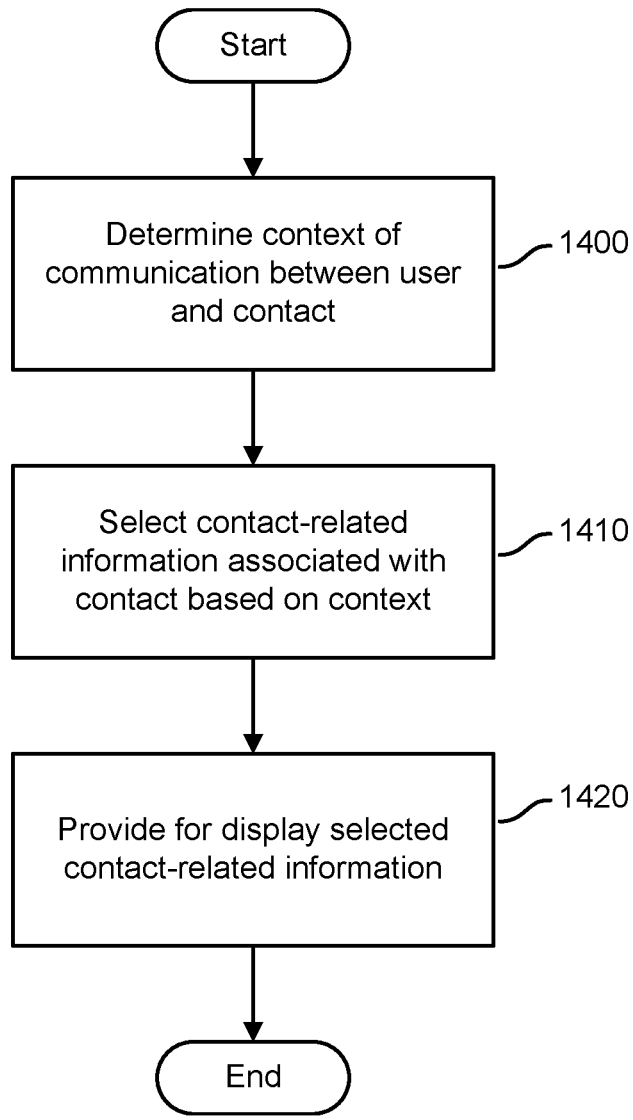
FIG. 14 is a flowchart illustrating embodiments of a process for determining contact-related information for display.

FIG. 14 is a flowchart illustrating embodiments of a process for determining contact-related information for display. In some embodiments, the process is performed by system 100 depicted in FIG. 1. At 1400, a context of a communication between a user and a contact may be determined. In some embodiments, a context of a communication (e.g., email communications) may include a nature of the communication(s) (e.g., casual, important, and/or other communication categorizations), intensity and/or magnitude of the communication(s) (e.g., length of emails, number of attachments, size of attachments, and/or other indicia of communication intensity/magnitude), content of communication(s) (e.g., information, included in the communication(s)), storage location(s) associated with communication(s) (e.g., email folder in which prior emails between user and contact have been filed), content associated with communication(s) (e.g., files, attachments, links, and/or other content associated with communication(s)), a recency and/or frequency of communication, and/or other information related to communication(s) between the user and the contact. In some embodiments, a recency of communication between a user (e.g., a user of mobile application 104 depicted in FIG. 1) and contact (e.g., a contact associated with a contact identifier) may include a period of time since a last communication sent or received by either the user or the contact and/or another interval of time. A frequency of communication between a user and a contact may be a number of communications between the user and contact, a number of communications over a period of time, and/or another measure a quantity of communications.

At 1410, contact-related information associated with a contact may be selected based on the context of communication. In some embodiments, a contact identifier may be mapped to contact-related information from a plurality of sources (e.g., an email account, business contact network account information, a social network account, documents, search results (e.g., news), a CRM account, and/or other information associated with the contact). According to various embodiments, information from the plurality sources may be selected for display to a user based on the context of communication between the user and the contact. For example, the context of communication may include a recency of communication between the user and the contact. If, for example, the user and the contact have no history of prior communication, business contact network information, social network account information, and search results may be displayed to provide the user with general background information about the contact. If, for example, the user and the contact have exchanged multiple communications in the past week (e.g., indicating high frequency and recency), email information, CRM account information, and news associated with the contact may be selected for display. The techniques for selecting contact-related information for display are of course not limited to these examples, and any combination of contact-related information may be selected for display based on any of the contexts of communication discussed herein or known in the art.

At 1420, the selected contact-related information may be provided for display. The selected information may, for example, be displayed in the context of the mobile application. In some embodiments, the arrangement of the display may be based on the frequency and/or recency of communication between the user and the contact.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method for determining contact related information, comprising:
    determining, by a processor of the host computer, an association between a contact address not specific to an original source of contact-related information and an identity of an entity at the original source of contact-related information by determining a first confidence of association between the contact address and an identity of the entity at a first source of contact-related information independent to the original source of contact-related information, determining a second confidence of association between the contact address and an identity of the entity at a second source of contact-related information independent to the original source of contact-related information, comparing the identity of the entity at the first source and the identity of the entity at the second source, updating the first confidence and second confidence based on the comparison, and determining whether the first confidence is above a threshold and whether the second confidence is above a threshold;
    storing, in memory of the host computing system, the contact-related information of the first source when the first confidence is above a threshold, the contact-related information of the second source when the second confidence is above a threshold, and the contact-related information of the first source and the contact-related information of the second source when both the first confidence is above a threshold and the second confidence is above a threshold;
    generating, in a user control interface, the stored contact-related information;
    embedding in the user control interface, a prompt for verification of the stored contact-related information; and
    responsive to a user verifying the stored contact-related information, storing the verified contact related information.

2. The method of claim 1, further comprising responsive to a user denying the stored contact-related information, deleting the stored the contact related information; determining that a third confidence of association between the contact address and an identity of the entity at a third source of contact-related information independent to the original source of contact-related information exceeds a threshold; generating, in a user control interface, the stored contact-related information; embedding in a user control interface, a prompt for verification of the stored contact-related information.

3. The method of claim 1, wherein determining the association comprises:
    receiving an indication that a user of the service has authenticated into the original source of contact-related information;
    determining that the contact address is associated with the user; searching the source for an identity of an entity associated with the user; and
    determining, based on the search, that the identity of the entity is associated with the contact address.

4. A data processing system configured for determining contact related information, the system comprising:
    a host computing system comprising one or more computers each with memory and at least one processor;
    an application executing in the host computing system; and,
    a contact related information determination module coupled to the application, the module comprising program code enabled upon execution in the host computing system to determine an association between a contact address not specific to an original source of contact-related information and an identity of an entity at the original source of contact-related information by determining a first confidence of association between the contact address and an identity of the entity at a first source of contact-related information independent to the original source of contact-related information, determining a second confidence of association between the contact address and an identity of the entity at a second source of contact-related information independent to the original source of contact-related information, comparing the identity of the entity at the first source and the identity of the entity at the second source, updating the first confidence and second confidence based on the comparison, and determining whether the first confidence is above a threshold and whether the second confidence is above a threshold;
    to store the contact-related information of the first source when the first confidence is above a threshold, the contact-related information of the second source when the second confidence is above a threshold, and the contact-related information of the first source and the contact-related information of the second source when both the first confidence is above a threshold and the second confidence is above a threshold;
    to generate, in a user control interface, the stored contact-related information;
    to embed in the user control interface, a prompt for verification of the stored contact-related information; and
    responsive to a user verifying the stored contact-related information, to store the verified contact related information.

5. The system of claim 4, further comprising responsive to a user denying the stored contact-related information, to delete the stored the contact related information; to determine that a third confidence of association between the contact address and an identity of the entity at a third source of contact-related information independent to the original source of contact-related information exceeds a threshold; to generate, in a user control interface, the stored contact-related information; and to embed in a user control interface, a prompt for verification of the stored contact-related information.

6. The system of claim 4, wherein to determine the association comprises:
    to receive an indication that a user of the service has authenticated into the source of contact-related information;
    to determine that the contact address is associated with the user; searching the source for an identity of an entity associated with the user; and
    to determine, based on the search, that the identity of the entity is associated with the contact address.

7. A computer program product for determining contact related information, the computer program product comprising a non-transitory computer readable storage medium having program instructions embodied therewith, the program instructions executable by a device to cause the device to perform a method comprising:

determining, by a processor of a host computer, an association between a contact address not specific to an original source of contact-related information and an identity of an entity at the original source of contact-related information by determining a first confidence of association between the contact address and an identity of the entity at a first source of contact-related information independent to the original source of contact-related information, determining a second confidence of association between the contact address and an identity of the entity at a second source of contact-related information independent to the original source of contact-related information, comparing the identity of the entity at the first source and the identity of the entity at the second source, updating the first confidence and second confidence based on the comparison, and determining whether the first confidence is above a threshold and whether the second confidence is above a threshold;

storing, in memory of the host computing system, the contact-related information of the first source when the first confidence is above a threshold, the contact-related information of the second source when the second confidence is above a threshold, and the contact-related information of the first source and the contact-related information of the second source when both the first confidence is above a threshold and the second confidence is above a threshold;

generating, in a user control interface, the stored contact-related information;

embedding in the user control interface, a prompt for verification of the stored contact-related information; and responsive to a user verifying the stored contact-related information, storing the verified contact related information.

8. The computer program product of claim 7, further comprising responsive to a user denying the stored contact-related information, deleting the stored the contact related information; determining that a third confidence of association between the contact address and an identity of the entity at a third source of contact-related information independent to the original source of contact-related information exceeds a threshold; generating, in a user control interface, the stored contact-related information; and embedding in a user control interface, a prompt for verification of the stored contact-related information.

9. The computer program product of claim 7, wherein determining the association comprises:

receiving an indication that a user of the service has authenticated into the original source of contact-related information;

determining that the contact address is associated with the user; searching the source for an identity of an entity associated with the user; and determining, based on the search, that the identity of the entity is associated with the contact address.

* * * * *